(12) United States Patent
Koike

(10) Patent No.: US 7,035,119 B2
(45) Date of Patent: Apr. 25, 2006

(54) SWITCHING POWER SOURCE DEVICE

(75) Inventor: Kengo Koike, Niiza (JP)

(73) Assignee: Sanken Electric Co., Ltd., Saitama (JP)

(*) Notice: Subject to any disclaimer, the term of this patent is extended or adjusted under 35 U.S.C. 154(b) by 0 days.

(21) Appl. No.: 10/525,894

(22) PCT Filed: Jul. 29, 2003

(86) PCT No.: PCT/JP03/09578

§ 371 (c)(1),
(2), (4) Date: Feb. 25, 2005

(87) PCT Pub. No.: WO2004/023634

PCT Pub. Date: Mar. 18, 2004

(65) Prior Publication Data
US 2005/0259448 A1 Nov. 24, 2005

(30) Foreign Application Priority Data
Aug. 30, 2002 (JP) ............................. 2002-255616

(51) Int. Cl.
*H02M 3/335* (2006.01)
(52) U.S. Cl. ................... 363/19; 363/21.13; 363/21.18; 363/97

(58) Field of Classification Search .................. 363/15, 363/16, 18–20, 21.01, 21.05, 21.12, 21.13, 363/21.15, 21.16, 21.17, 21.18, 97, 131
See application file for complete search history.

(56) References Cited

U.S. PATENT DOCUMENTS

| 5,999,421 A | * | 12/1999 | Liu | 363/21.15 |
| 6,515,876 B1 | * | 2/2003 | Koike et al. | 363/21.16 |
| 6,529,391 B1 | * | 3/2003 | Yoshinaga et al. | 363/21.15 |
| 6,842,350 B1 | * | 1/2005 | Yamada et al. | 363/21.16 |
| 6,947,298 B1 | * | 9/2005 | Uchida | 363/21.17 |

* cited by examiner

*Primary Examiner*—Gary L Laxton
(74) *Attorney, Agent, or Firm*—Bachman & LaPointe, P.C.

(57) ABSTRACT

A switching power source comprises a current comparator 27 for comparing a voltage level of signals acquired by a current detector 9 with a reference voltage level $V_{DT}$ to produce detection signals $V_{CP}$ of first or second level L or H; an edge detector 28a for sensing an edge of drive signal $V_G$ supplied to a gate terminal of MOS-FET 3 during the period of transition from turning on to off of MOS-FET 3; and a decision means 28b for receiving a current detection signal $V_{CP}$ from current comparator 27 to produce an output signal $V_{LD}$ when edge detector 28a catches an edge of drive signal $V_G$; wherein decision means 28b produces different output signals $V_{LD}$ of respectively first and second voltage levels L and H under the light and heavy load conditions to precisely and certainly detect on the primary side of transformer 2 the load condition on the secondary side of transformer 2 for improvement in conversion efficiency.

11 Claims, 24 Drawing Sheets (A) $V_{DS}$ (B) $I_D$ (C) $V_{BM}$ $V_{TH}$ (D) $V_{BD}$ $t_D$ Prior Art

SWITCHING POWER SOURCE DEVICE

TECHNICAL FIELD

This invention relates to a switching power source, in particular, of the type wherein a primary side of a transformer can serve to accurately and reliably detect an electrical load condition on a secondary side to improve the conversion efficiency.

BACKGROUND OF THE INVENTION

A known switching power source of self-induced flyback type such as RCC (ringing choke converter) is defective in that it increases on-off switching frequency of a switching element when an electric load becomes light because the on-period of the switching element becomes shorter with the shorter period of producing flyback voltage on a secondary winding of a transformer. A typical on-off switching frequency or oscillation frequency of switching element generally ranges from 30 to 70 kHz under the maximum load and from 200 to 400 kHz under the minimum load. Thus, with the lighter load, the number of times the switching element is turned on and off is increased, resulting in augmentation of switching loss and reduction of conversion efficiency during the light load period. Accordingly, even a switching power source of 85% conversion efficiency under the maximum load may sometimes reduce the conversion efficiency equal to or less than 10% under the minimum load.

A typical switching power source of PWM (pulse width modulation) flyback type does not change the switching loss of switching element because oscillation frequency is constant either under the minimum load such as stand-by state or under the maximum load such as normal state. However, as electric loss other than switching loss is decreased during the light load period, switching loss occupies a major proportion, reducing the conversion efficiency.

To overcome the foregoing defects, Japanese Patent Disclosure No. 9-140128 demonstrates a switching power source which, as shown in FIG. 26, comprises a microcomputer 108 provided on a secondary side of a transformer 106 for detecting or controlling operation of a device; and a delivery circuit 109 for transporting control signals from microcomputer 108 to a primary side of transformer 106 to control oscillation frequency of the power source by microcomputer 108 during the stand-by mode. A switch element 101 is connected to a primary winding of transformer 106 to control electric current flow through the primary winding. A drive circuit 102 produces drive signals to switch element 101 which is turned on when electric voltage applied on a control terminal of switch element 101 reaches a threshold level. A drive controller 103 serves to control on-time of switch element 101 to stabilize the output voltage from secondary side. A secondary rectifying and smoothing circuit 104 is connected to a secondary winding of transformer 106, and a primary rectifying and smoothing circuit 105 is connected to a primary auxiliary winding of transformer 106. Transformer 106 functions to electrically insulate between primary and secondary sides, and simultaneously, forms an electromagnetic coupling to convert a primary input electric voltage into a desired secondary output voltage. A detector 107 picks out a secondary output voltage generated from secondary rectifying and smoothing circuit 104. This switching power source is advantageous because it reduces switching loss in the stand-by mode or during the light load period, thereby resulting in improved conversion efficiency, however disadvantageous because it requires increased number of required components that causes rise in cost of manufacture. Also, it is actually impossible to apply the switching power source to AC adaptors for small electronic devices such as mobile phones or personal handy phone systems or portable personal computers because the power source involves a large-scale addresser such as a microcomputer.

In the meantime, to detect electrical load condition on the secondary side, the load current has to be detected on the second side and then transmitted to the primary side. Alternatively, a microcomputer has to be provided in the secondary side to deliver command signals from such a microcomputer to the primary side. However, in any event, these arrangements have a drawback of increase in number of required components for assembly. Accordingly, it would be necessary for the power source to accurately discern the secondary load condition directly from the primary side in order to minimize number of required components. Techniques for appreciating the secondary load condition on the primary side include measurements of: switching current flow through a switching element; voltage feedback signals from secondary side; and time period of flyback voltage generated through a winding of transformer. The first technique for measuring switching current flow through switching element is generally realized in many cases as an over-current protector (OCP) which may comprise a resistor for detecting electric current therethrough and a comparator connected to the resistor. This technique, however, unfavorably may cause capacitative short-circuit over-current to flow through the switching element at the moment of turning it on as shown in FIG. 27 due to a parasitic capacitance formed by an inherent structure in the switching element; a snubber circuit (such as a capacitor) connected between two electrodes of the switching element for reduction of noise or another snubber circuit connected between windings of transformer to reduce noise and protect the switching element. The capacitative short-circuit over-current disturbs the accurate detection of secondary load condition because the over-current cannot be determined only by the secondary load condition, and moreover, a peak value of the over-current may be elevated over a peak value of a secondary load current during the light load period. For that reason, without accomplishing any purpose for detecting the secondary load condition, namely, light or heavy load condition, the foregoing current detecting resistor is generally used as a protective circuit against over-current for restricting excessive switching current in case of preventing some malfunction of the switching element (for example, overload condition by a damaged secondary circuit or uncontrolled condition by a damaged control system). Accordingly, such a prior art switching power source makes it very difficult to exactly detect the secondary load condition on the primary side with minimum number of required components in order to select an optimal oscillation operation based on the detection result on the primary side and thereby improve the conversion efficiency of the power source.

Hence, an object of the present invention is to provide a switching power source capable of exactly detecting a secondary load condition on a primary side of a transformer for improvement of the conversion efficiency.

SUMMARY OF THE INVENTION

The switching power source according to the present invention comprises a DC power source (1); a primary winding (2a) of a transformer (2) and a switching element (3) connected in series to the DC power source (1); a current detector (9) for acquiring electric current ($I_D$) flowing through the primary winding (2a) of the transformer (2) or the switching element (3); a rectifying smoother (6) connected to a secondary winding (2b) of the transformer (2) for generating DC output voltage ($V_{OUT}$); and a control circuit (8) for supplying the switching element (3) with drive signals ($V_G$) to turn the switching element (3) on and off so as to keep the DC output voltage ($V_{OUT}$) on a substantially constant level. The control circuit (8) comprises a current comparator (27) for comparing a voltage level of signals acquired by the current detector (9) with a reference voltage level ($V_{DT}$) to produce detection signals ($V_{CP}$) of first or second level (L or H); an edge detector (28a) for sensing an edge of drive signal ($V_G$) supplied to a control terminal of the switching element (3) during the period of transition from turning on to off of the switching element (3); and a decision means (28b) for receiving a current detection signal ($V_{CP}$) from the current comparator (27) to produce an output signal ($V_{LD}$) when the edge detector (28a) catches an edge of drive signal ($V_G$); wherein the decision means (28b) produces the different output signals ($V_{LD}$) of respectively first and second voltage levels (L and H) under the light load condition and non-light load condition heavier than light load. Accordingly, the decision means (28b) can correctly appreciate the load condition based on output signals of the current detector (9) at the transitional time of turning the switching element (3) from on to off, without any error in the decision resulted from capacitative short-circuit current such as surge current which may occur at the time of turning on of the switching element (3) so that the load condition on the secondary side of the transformer (2) can precisely and certainly be detected on the primary side of the transformer (2). Also, the decision on the load condition is hardly susceptive to influences of foreign noise such as inductive noise.

In a first embodiment of the present invention, the control circuit (8) is provided with an oscillation controller (22) which reduces the oscillation frequency of drive signals ($V_G$) when the decision means (28b) produces the output signal ($V_{LD}$) of the first voltage level (L), and adversely, increases the oscillation frequency of drive signals ($V_G$) when the decision means (28b) produces the output signal ($V_{LD}$) of the second voltage level (H). Under the light load condition, a small amount of electric current ($I_D$) flows through the primary winding (2a) of the transformer (2) or switching element (3) so that the decision means (28b) generates the output signal ($V_{LD}$) of the first voltage level (L) which reduces the oscillation frequency of drive signals ($V_G$) applied to the control terminal of the switching element (3) from the oscillation controller (22) to lower the switching number of the switching element (3). This allows decrease in switching loss during the light load period and also enhancement in conversion efficiency of the switching power source in a wider load fluctuation range.

In a second embodiment of the present invention, the control circuit (8) is provided with a voltage adjuster (31) which either controls the reference voltage level ($V_{DT}$) of the current comparator (27) in the same direction as the movement of peak voltage value of detection signal ($V_{OCP}$) by the current detector (9) or controls the voltage level of the detection signal ($V_{OCP}$) in the opposite direction from the movement of peak voltage value of detection signal ($V_{OCP}$) by the current detector (9), when the decision means (28b) changes the voltage level of the output signal ($V_{LD}$). Change in load causes the variation in oscillation frequency of drive signals ($V_G$) to change a maximum value of switching current ($I_D$) through the primary side. At the moment, the voltage adjuster (31) either controls the reference voltage level ($V_{DT}$) of the current comparator (27) in the same direction as the movement of peak voltage value of detection signal ($V_{OCP}$) by the current detector (9) or controls the voltage level of the detection signal ($V_{OCP}$) in the opposite direction from the movement of peak voltage value of detection signal ($V_{OCP}$) by the current detector (9), to thereby stably alter oscillation frequency of the switching element (3) at the time of change in load.

In a third embodiment of the present invention, the control circuit (8) comprises a bottom voltage detector (41) for detecting a minimum level of the voltage ($V_{DS}$) between main terminals of the switching element (3) during the off period thereof; and a skip controller (42) which turns the switching element (3) on in response to a first minimum level (every minimum level) of the voltage ($V_{DS}$) detected by the bottom voltage detector (41) under the heavy load condition, that is, when the decision means (28b) produces the output signal ($V_{LD}$) of the second voltage level (H), otherwise, turns the switching element (3) on in response to a second or later minimum level (every other or later minimum level) detected by the bottom voltage detector (41) under the light load condition, that is, when the decision means (28b) produces the output signal ($V_{LD}$) of the first voltage level (L). In this way, under the light load condition, the switching element (3) is turned on in response to a second or later minimum level detected by the bottom voltage detector (41) to thereby expand the off period of the switching element (3), reducing the switching frequency of the switching element (3). Accordingly, decrease in switching number of the switching element (3) causes diminution in switching loss under the light load condition to improve conversion efficiency of the switching power source in a wider load fluctuation range. In another aspect, flyback energy in the transformer (2) is supplied from the second winding (2b) through the rectifying smoother (6) to load within a relatively short period of time under the light load condition after the switching element (3) is turned off so that a narrow pulse voltage involving free oscillation components is produced across the switching element (3). Consequently, when the bottom voltage detector (41) detects a second or later minimum level of the narrow pulse voltage, the switching element (3) is turned on by the skip controller (42) to expand the off period of the switching element (3), lowering the switching frequency of the switching element (3). Under the heavier load condition than light load, flyback energy in the transformer (2) is supplied from the secondary winding (2b) through the rectifying smoother (6) to load over a relatively long period of time after the switching element (3) is turned off so that a wide pulse voltage is produced across the switching element (3). Therefore, when the bottom voltage detector (41) detects a first minimum level of the wide pulse voltage, the switching element (3) is turned on by the skip controller (42) so that preudo resonance action is done to switch the switching element (3) from the off to the on condition at the time of the minimum level (bottom point) of the voltage ($V_{DS}$) across the switching element (3) after a reset period of the transformer (2) is finished. In the third embodiment, the bottom voltage detector (41) comprises a wave forming means for transforming, into pulse arrays, ringing voltages ($V_{BM}$) produced on a drive winding (2c) of the transformer (2) during the off period of the switching element (3), and the bottom voltage detector (41) may find a rising edge of the pulse array voltage ($V_{BD}$) as a minimum level of the voltage ($V_{DS}$) across the switching element (3).

A fourth embodiment of the present invention comprises a plurality of current comparators (27, 62), a plurality of edge detectors (28a) and a plurality of decision means (28b, 63) wherein the current comparators (27, 62) compare a detection signal ($V_{OCP}$) by current detector (9) with levels of different reference voltages ($V_{DT1}$, $V_{DT2}$) to reduce oscillation frequency of drive signals ($V_G$) to different frequencies by output signals ($V_{LD1}$, $V_{LD2}$) of the first level of the voltage output from the decision means (28b, 63). Under the light load condition, oscillation frequency of drive signals ($V_G$) applied to the control terminal of the switching element (3) can be lowered to different frequencies in response to the load condition to accomplish fine control of the oscillation frequency and improve conversion efficiency of the switching power source.

In a fifth embodiment of the present invention, the control circuit (8) comprises an intermittent oscillation controller (71) for suspending the on-off operation of the switching element (3) for a given period of time sufficiently longer than an oscillation cycle of the drive signals ($V_G$) when the decision means (28b) produces the output signal ($V_{LD}$) of the first voltage level (L). Under the light load condition wherein smaller electric current ($I_D$) flows through the primary winding (2a) of the transformer (2) or switching element (3), the output signal ($V_{LD}$) of the decision means (28b) is on the first voltage level (L) to cease the on-off operation of the switching element (3) by the intermittent oscillation controller (71) for a certain period of time ($t_B$) perfectly longer than the oscillation cycle of the drive signals ($V_G$), extremely reducing the switching number of the switching element (3). This allows steep reduction in the switching loss under the light load mode and attains enhancement in conversion efficiency of the switching power source in a wider load fluctuation range.

In each embodiment of the present invention, the edge detector (28a) and decision means (28b) may comprise a single D-flip flop (28). The switching power source of the invention further comprises a trigger means (10) connected to the DC power source (1) for supplying the control circuit (8) with initial power during starting; a drive winding (2c) electromagnetically coupled to the primary and secondary windings (2a, 2b) of the transformer (2); and an auxiliary rectifying smoother (13) connected to the drive winding (2c) for providing the control circuit (8) with DC voltage ($V_{IN}$). It should be understood that the instant invention is applicable to a switching power source which includes a drive circuit for furnishing the control circuit (8) with drive power from the DC power source (1). In addition, the switching power source may comprise a switching element (91) provided with a divergent or shunt means (92) for dividing an electric current flow ($I_D$) through a closed circuit inclusive of the primary winding (2a) of the transformer (2) to detect by the current detector (9) the divided electric current through the divergent means (92).

BRIEF DESCRIPTION OF THE DRAWINGS

The above-mentioned and other objects and advantages of the present invention will be apparent from the following description in connection with preferred embodiment shown in the accompanying drawings wherein.

BEST MODE FOR CARRYING OUT THE INVENTION

Embodiments of the switching power source according to the present invention will be described hereinafter in connection with FIGS. 1 to 25 of the drawings.

Figure 1:
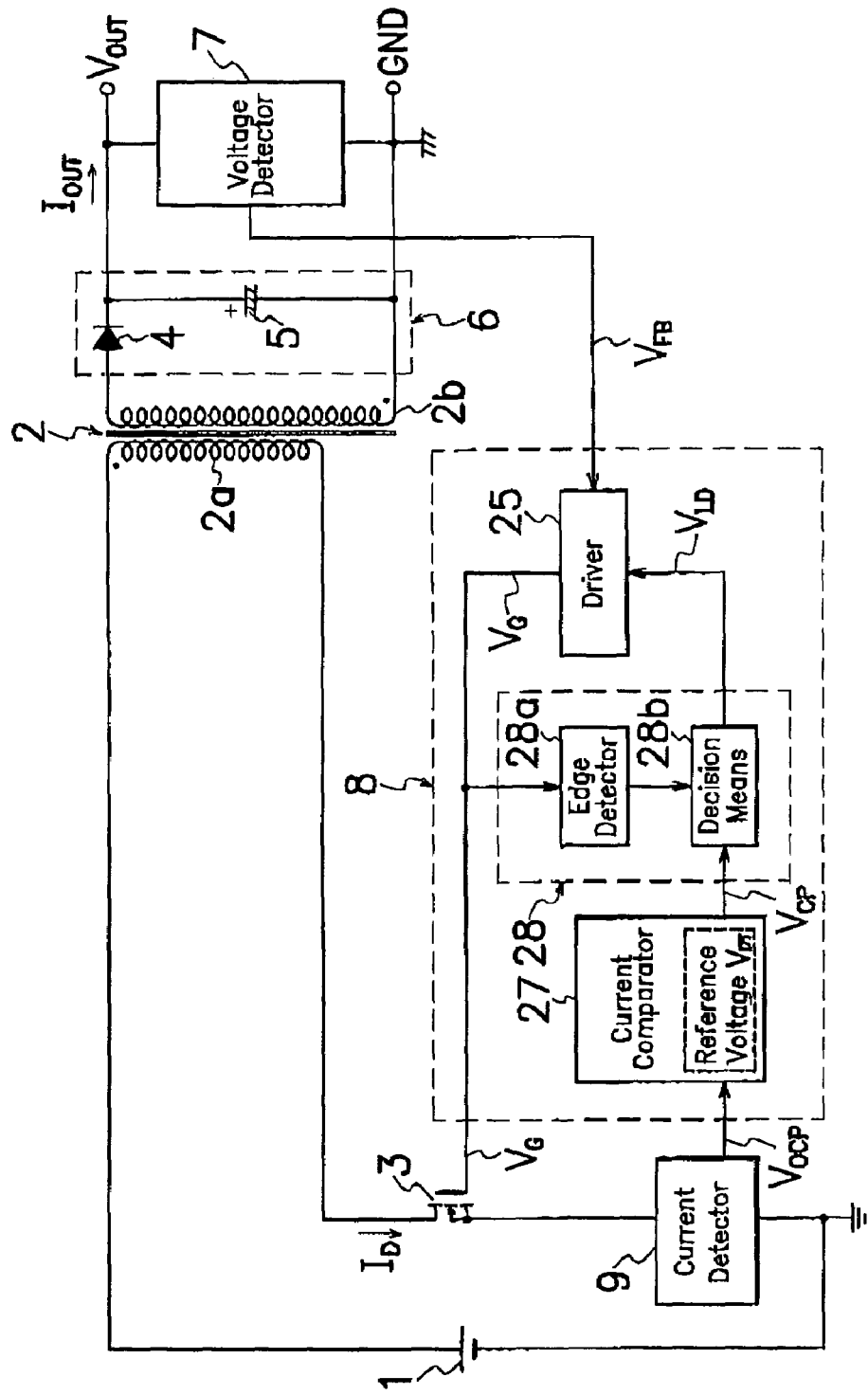
FIG. 1 is a block circuit diagram indicating a basic concept of a switching power source according to the present invention.

FIG. 1 is a block circuit diagram indicating a basic concept of a switching power source according to each embodiment of the present invention. The switching power source shown in FIG. 1 comprises a DC power source 1; a primary winding 2a of a transformer 2 and a switching element or MOS-FET (Field Effect Transistor of MOS type) 3 connected in series to DC power source 1; a rectifying smoother 6 which comprises a rectifying diode 4 connected to a secondary winding 2b of transformer 2 and a smoothing capacitor 5 to generate DC output voltage $V_{OUT}$; a voltage detector (output voltage detecting circuit) 7 for sensing DC output voltage $V_{OUT}$; a control circuit 8 which comprise a driver 25 for receiving detection signals $V_{FB}$ from voltage detector 7 and supplying MOS-FET 3 with drive signals $V_G$ to turn MOS-FET 3 on and off so as to keep DC output voltage $V_{OUT}$ on a substantially constant level; and a current detector (current-detecting resistor) 9 for acquiring electric current $I_D$ flowing through primary winding 2a of transformer 2 or MOS-FET 3. Control circuit 8 comprises a current comparator (current-detecting comparator) 27 for comparing a voltage level $V_{OCP}$ of signals acquired by current detector 9 with a reference voltage level $V_{DT}$ to produce detection signals $V_{CP}$ of first and second level L and H when acquired voltage level $V_{OCP}$ respectively does not reach and exceed reference voltage level $V_{DT}$; an edge detector 28a for sensing an edge of drive signal $V_G$ supplied to a control or gate terminal of MOS-FET 3 during the transition period from turning on to off of MOS-FET 3; and a decision means 28b for receiving a current detection signal $V_{CP}$ from current comparator 27 to produce an output signal $V_{LD}$ when edge detector 28a catches an edge of drive signal $V_G$. In the power source shown in FIG. 1, decision means 28b produces different output signals $V_{LD}$ of respectively first and second voltage levels L and H under the light and ordinary load conditions. This ordinary load is shown by the second voltage level H as meaning a load heavier than light load, and ranging from an intermediate or normal load to heavy load. In embodiments shown in and after FIG. 2, edge detector 28a and decision means 28b may comprise a single D-flip flop 28.

Figure 2:
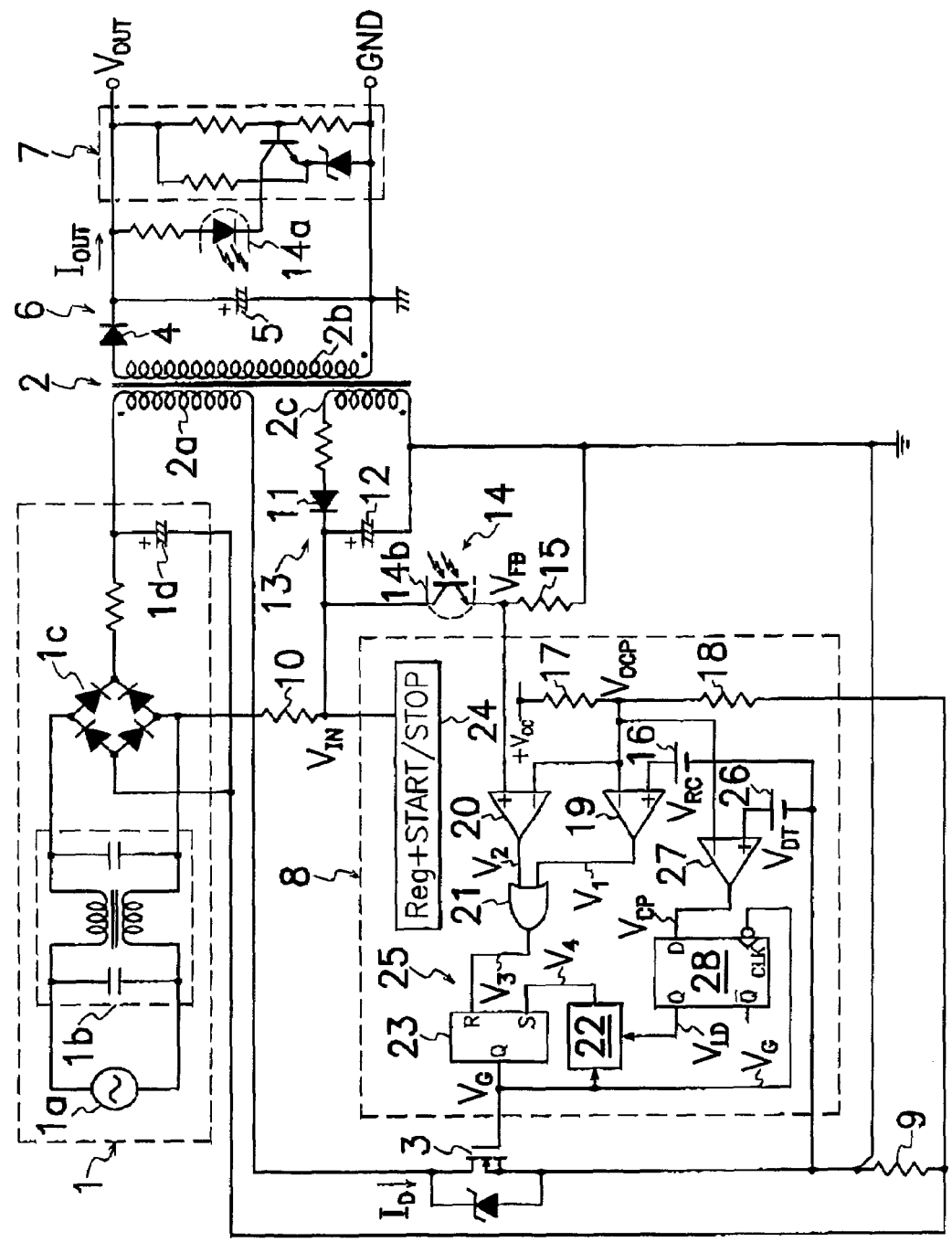
FIG. 2 shows a first embodiment of a DC-DC converter of separately excited flyback type which materializes the switching power source according to the present invention.
Figure 3:
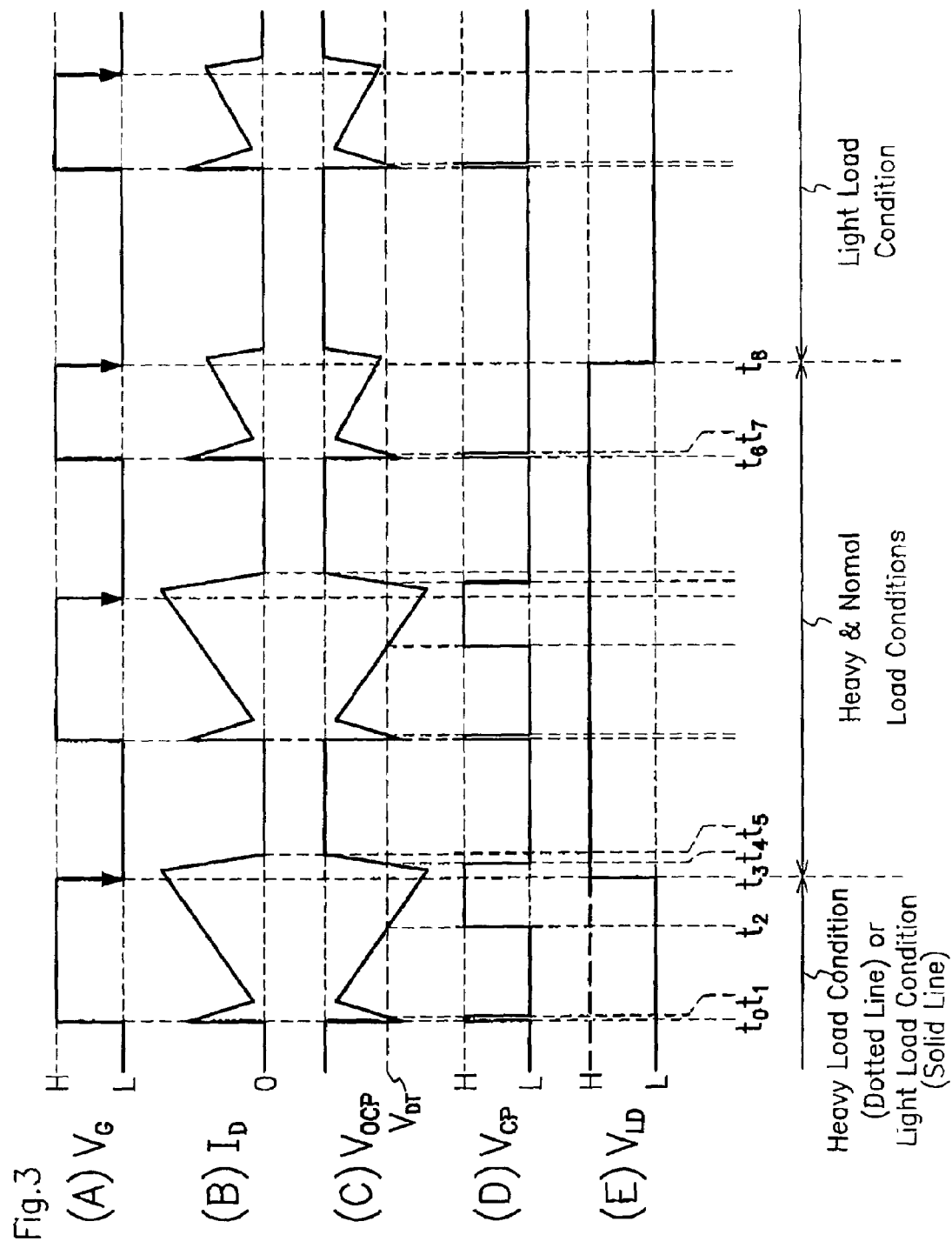
FIG. 3 is a time chart indicating wave forms of input and output signals of D-flip flop with variation of switching current in the circuit shown in FIG. 2.
Figure 4:
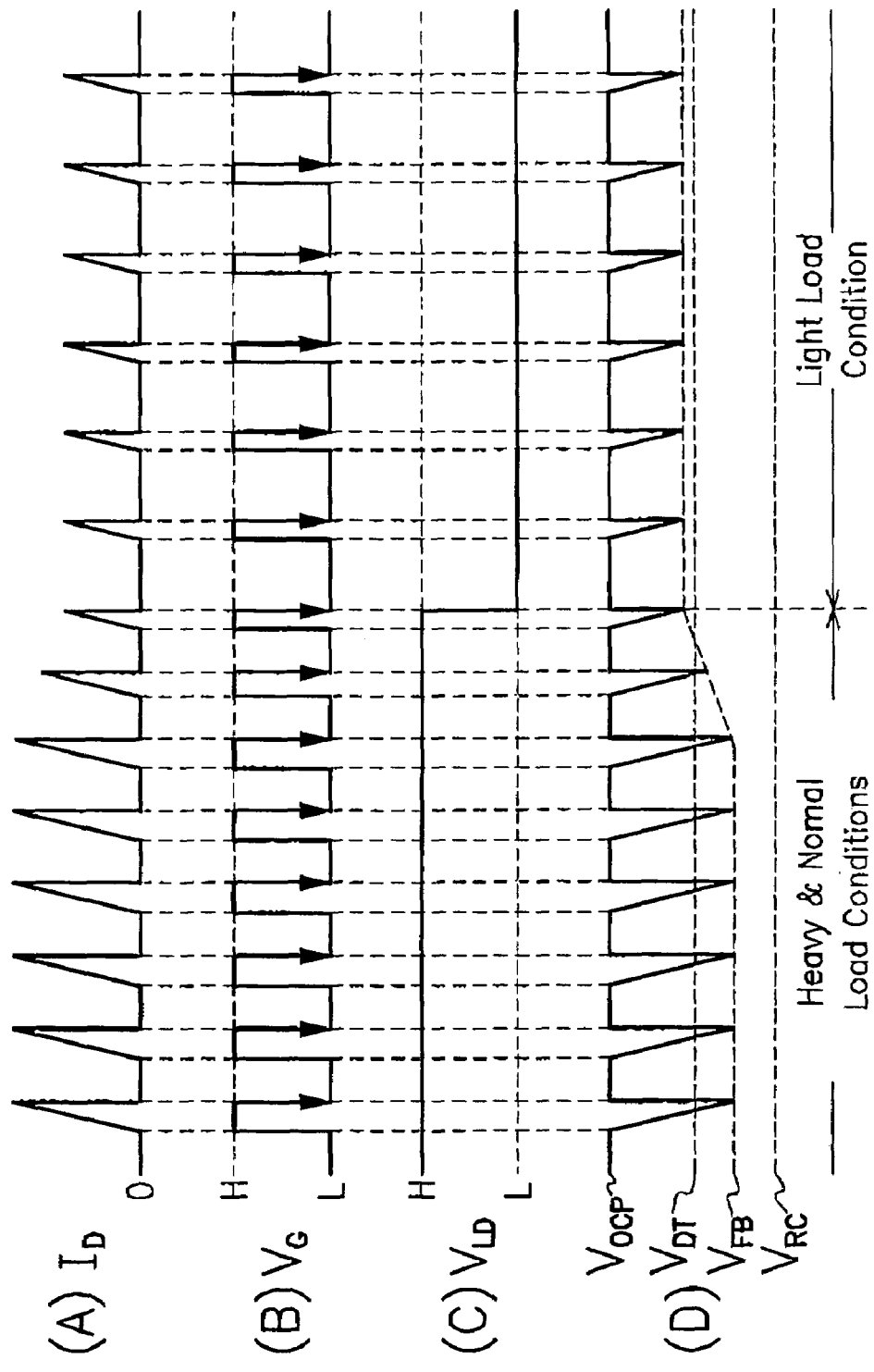
FIG. 4 is a time chart indicating an electric current and voltages for various points in the circuit shown in FIG. 2.

FIG. 2 demonstrates an embodiment of DC-DC converter of separately excited flyback type as a switching power source according to the present invention. This DC-DC converter of FIG. 2 comprises a DC power source 1 which includes a rectifying bridge circuit 1c connected to an AC power source 1a through a filter circuit 1b and a smoothing capacitor 1d connected to rectifying bridge circuit 1c; a primary winding 2a of a transformer 2 and a MOS-FET 3 connected in series to DC power source 1; a rectifying smoother 6 which comprises a rectifying diode 4 connected to a secondary winding 2b of transformer 2 and a smoothing capacitor 5 to generate DC output voltage $V_{OUT}$; a voltage detector (output voltage detecting circuit) 7 for sensing DC output voltage $V_{OUT}$; a control circuit 8 which receives detection signals $V_{FB}$ from voltage detector 7 and supplying MOS-FET 3 with drive signals $V_G$ to turn MOS-FET 3 on and off so as to keep DC output voltage $V_{OUT}$ on a substantially constant level; and a current detector or detection resistor 9 for acquiring as a negative voltage electric current $I_D$ flowing through primary winding 2a of transformer 2 or MOS-FET 3; a trigger resistor 10 as a trigger means connected to rectifying bridge circuit 1c of DC power source 1 for supplying control circuit 8 with initial drive power during starting; a drive winding 2c electromagnetically coupled to primary and secondary windings 2a, 2b of transformer 2; and an auxiliary rectifying smoother 13 connected to drive winding 2c for providing control circuit 8 with DC voltage $V_{IN}$. Detection outputs from voltage detector 7 is forwarded to primary side of transformer 2 through a photo-coupler 14 of light emitting and receiving elements 14a and 14b to deliver an induced voltage $V_{FB}$ on a junction of light receiving element 14b and resistor 15 to control circuit 8 as induced voltage $V_{FB}$ indicates a detection output from voltage detector 7.

Control circuit 8 comprises a controlled power source 16 for producing a reference voltage $V_{RC}$ as a reference voltage generator to regulate a maximum value of current flow through primary winding 2a of transformer 2 or MOS-FET 3; adjustment resistors 17 and 18 for shifting a negative voltage level acquired by detection resistor 9; a restrictive comparator 19 for outputting an electric signal $V_1$ of high voltage level H to turn MOS-FET 3 off when level-shifted detection signal $V_{OCP}$ by detection resistor 9 reaches reference voltage $V_{RC}$ of power source 16; a regulatory comparator 20 for outputting an electric signal $V_2$ of high voltage H when level-shifted detection signal $V_{OCP}$ of detection resistor 9 reaches voltage level of detection signal $V_{FB}$ from voltage detector 7; an OR gate 21 for outputting logical sum signal $V_3$ of outputs $V_1$ and $V_2$ from restrictive and regulatory comparators 19 and 20; a pulse generator 22 for outputting pulse signal $V_4$ each time a constant time has elapsed after MOS-FET 3 is turned off; an RS flip flop 23 set by pulse signal $V_4$ from pulse generator 22 to provide gate terminal of MOS-FET 3 with drive signal $V_G$ of high voltage level H, and reset by logical sum signal $V_3$ from OR gate 21 to provide gate terminal of MOS-FET 3 with drive signal $V_G$ of low voltage level L; a control power circuit 24 for supplying each element 16 to 28 of control circuit 8 with DC drive power when DC voltage $V_{IN}$ from trigger resis 10 or auxiliary rectifying smoother 13 reaches a given DC voltage $V_{IN}$, and also for ceasing supply of DC drive power to each elements 16 to 28 when DC voltage $V_{IN}$ is reduced to an inoperable level; a power source 26 for producing a reference voltage $V_{DT}$ which regulates a voltage level to examine a load condition not shown; a current detection comparator 27 as a current detection cooperating means for outputting current detection signals of low and high voltage levels L and H respectively when shifted or divided voltage level $V_{OCP}$ from detection resistor 9 does not reach and exceed reference voltage level $V_{DT}$ of power source 26; and a D-flip flop 28 having a clock input terminal CLK for receiving drive signals $V_G$ also applied to gate terminal of MOS-FET 3. D-flip flop 28 firstly takes in, through data input terminal D, current detection signal $V_{CP}$ produced from current detection comparator 27 when drop or trailing edge of drive signals $V_G$ applied to gate terminal of MOS-FET 3 upon the transition of turning MOS-FET 3 from the on to the off condition, secondly generates from output terminal Q output signals $V_{LD}$ of the substantially same voltage level as that of current detection signals $V_{CP}$, and thirdly retains output signals $V_{LD}$ until a subsequent trailing edge of drive signal $V_G$ has again inputted to clock input terminal CLK after the previous trailing edge of drive signals $V_G$ is inputted. Driver 25 shown in FIG. 1 comprises a regulatory comparator 20, OR gate 21, pulse generator 22 and RS flip flop 23. Pulse generator 22 comprises an oscillation controller which elongates occurrence cycle of pulse signals $V_4$ when D-flip flop 28 produces output signals $V_{LD}$ of low voltage level L to lower oscillation frequency of drive signals $V_G$ by extending off-time of drive signals $V_G$ applied from RS flip flop 23 to gate terminal of MOS-FET 3. Adversely, oscillation controller of pulse generator 22 shortens occurrence cycle of pulse signals $V_4$ when D-flip flop 28 produces output signals $V_{LD}$ of high voltage level H to increase oscillation frequency of drive signals $V_G$ by reducing off-time of drive signals $V_G$ applied from RS flip flop 23 to gate terminal of MOS-FET 3. Off-time of drive signals $V_G$, namely time for keeping drive signals $V_G$ in low voltage level is set in a range for example between 10 to 50 microseconds. Also, voltage level on current detection resistor 9, in other words, junction voltage $V_{OCP}$ of level-shifting resistors 17 and 18 is set by appropriate adjustment of each resistance value of resistors 17 and 18, for example, as zero volt before starting, and as 1.5 volts after starting and when electric current $I_D$ through MOS-FET 3 is zero.

FIG. 3(A) to 3(E) represents each waveform of drive signals $V_G$ applied to gate terminal of MOS-FET 3, drain current $I_D$ through MOS-FET 3, voltage $V_{OCP}$ on a junction of level-shifting resistors 17 and 18, current detection signal $V_{CP}$ from current detection comparator 27 and output signals $V_{LD}$ from D-flip flop 28. FIG. 3(A) shows drive signals $V_G$ applied to gate terminal of MOS-FET 3 wherein voltage level of drive signal $V_G$ is elevated from low voltage L to high voltage H at point $t_0$ under the heavy and normal load conditions. Therefore, MOS-FET 3 is turned on so that capacitative short-circuit current instantaneously flows through MOS-FET 3, and drain current $I_D$ rapidly increases as shown in FIG. 3(B). As a result, as divided voltage $V_{OCP}$ is lowered below reference voltage level $V_{DT}$ of power source 26 as shown in FIG. 3(C), current detection comparator 27 produces current detection signal $V_{CP}$ of high voltage level H as shown in FIG. 3(D). Then, when divided voltage $V_{OCP}$ reaches above reference voltage level $V_{DT}$ of power source 26 at point $t_1$, voltage level of current detection signal $V_{CP}$ is turned from high voltage level H to low voltage level L.

When MOS-FET 3 is turned on, drain current $I_D$ linearly increases as depicted in FIG. 3(B), and simultaneously divided voltage $V_{OCP}$ linearly decreases. Then, when divided voltage $V_{OCP}$ reduces beneath reference voltage level $V_{DT}$ of power source 26 at point $t_2$, current detection signal $V_{CP}$ from current detection comparator 27 is switched from low voltage level L to high voltage level H as shown in FIG. 3(D). At the time drive signals $V_G$ applied to gate terminal of MOS-FET 3 is turned from high voltage level H to low voltage level L at point $t_3$, MOS-FET 3 is turned from on to off condition. At this point, as current detection signal $V_{CP}$ from current detection comparator 27 remains on high voltage level H as shown in FIG. 3(D), under the light load condition before point $t_0$, D-flip flop 28 changes signal $V_{LD}$ from output terminal Q from low voltage level L to high voltage level H as shown in a solid line of FIG. 3(E). Otherwise, under the heavy and normal load conditions before point $t_0$, signal $V_{LD}$ outputted from output terminal Q of D-flip flop 28 is retained on high voltage level H as shown by dotted line of FIG. 3(E). Accordingly, under the heavy and normal load conditions, D-flip flop 28 produces output signal $V_{LD}$ of high voltage level H from output terminal Q to generate pulse signals $V_4$ of shorter cycle from pulse generator 22.

When MOS-FET 3 is turned off, drain current $I_D$ gradually decreases as shown in FIG. 3(B) due to response delay of MOS-FET 3 itself or Miller effect resulted from stray capacitance of MOS-FET 3 etc., and simultaneously, divided voltage $V_{OCP}$ gradually increases as shown in FIG. 3(C). In case voltage $V_{OCP}$ increases over reference voltage $V_{DT}$ of power source 26 at point $t_4$, current detection signal $V_{CP}$ from current detection comparator 27 is switched from high voltage level H to low voltage level L as shown in FIG. 3(D), and drain current $I_D$ comes to substantially zero at a point $t_5$ as shown in FIG. 3(B).

When the situation is moved from the heavy and normal load conditions to the light load condition, drive signal $V_G$ applied to gate terminal of MOS-FET 3 is shifted from low voltage level L to high voltage level H at point $t_6$ as shown in FIG. 3(A) to turn MOS-FET 3 on so that capacitative short-circuit current instantaneously flows through MOS-FET 3 similarly to the above-mentioned operation during the period of time between points $t_0$ and $t_1$, rapidly increasing drain current $I_D$ as exhibited in FIG. 3(B). At the same time, as divided voltage $V_{OCP}$ is diminished under reference voltage $V_{DT}$ of power source 26 as indicated by FIG. 3(C), current detection comparator 27 produces current detection signal $V_{CP}$ of high voltage level H as shown in FIG. 3(D). After that, when voltage $V_{OCP}$ increases over reference voltage $V_{DT}$ of power source 26 at point $t_7$, comparator 27 changes current detection signal $V_{CP}$ from high voltage level H to low voltage level L. When MOS-FET 3 is turned on, drain current $I_D$ linearly increases as shown in FIG. 3(B), however, to the contrary, divided voltage $V_{OCP}$ linearly decreases as shown in FIG. 3(C). As on-time of MOS-FET 3 under the light load condition is shorter than on-time between points $t_0$ and $t_3$ under the heavy and normal load conditions, drive signal $V_G$ is switched from high voltage level H to low voltage level L at relatively early point $t_8$ as shown in FIG. 3(A) to turn MOS-FET 3 from on to off condition. For that reason, divided voltage $V_{OCP}$ does not reach reference voltage $V_{DT}$ of power source 26 as shown in FIG. 3(C), and current detection signal $V_{CP}$ from current detection comparator 27 is retained on low voltage level L as shown in FIG. 3(D). As a result, D-flip flop 28 switches output signal $V_{LD}$ at output terminal Q from high voltage level H to low voltage level L at point $t_8$ under the light load condition to generate pulse signals $V_4$ of longer cycle from pulse generator 22.

In initially operating DC-DC converter of separately excited flyback type shown in FIG. 2, charging current flows from DC power source 1 through trigger resistor 10 to a smoothing drive capacitor 12 of auxiliary rectifying smoother 13. When charged voltage $V_{IN}$ of drive capacitor 12 reaches a drive voltage, control power source 24 in control circuit 8 starts supplying DC power to each element 16 to 28 in control circuit 8. Accordingly, pulse generator 22 is driven to give a set terminal S of RS flip flop 23 a pulse signal $V_4$ from pulse generator 22 so that RS flip flop 23 is turned to the set condition to supply gate terminal of MOS-FET 3 with drive signals $V_G$ of high voltage level H from RS flip flop and thereby turn MOS-FET 3 on. At this moment, linearly increasing drain current $I_D$ flows through MOS-FET 3, whereas divided voltage $V_{OCP}$ linearly decreases. When voltage $V_{OCP}$ is lowered to reference voltage $V_{RC}$ of power source 16, overcurrent control comparator 19 produces signal $V_1$ of high voltage level H. Meanwhile, as voltage detector 7 produces detection signal $V_{FB}$ of substantially zero voltage level during starting, current mode controlling comparator 20 produces output signal $V_2$ of low voltage level L. Accordingly, OR gate 21 outputs a logic sum signal $V_3$ of high voltage level H to input terminal R of RS flip flop 23 to reset RS flip flop 23 which provides gate terminal of MOS-FET 3 with drive signal $V_G$ of low voltage level L to turn MOS-FET 3 off so that drain current $I_D$ through MOS-FET 3 declines to nearly zero level. When a period of time has lapsed after MOS-FET 3 is turned off, pulse generator 22 again gives set terminal S of RS flip flop 23 pulse signal $V_4$ to switch RS flip flop 23 to the set condition so that RS flip flop 23 supplies gate terminal of MOS-FET 3 with drive signal of high voltage level H to again turn MOS-FET 3 on. In this way, repeated on-and-off operation causes linear rise in DC output voltage $V_{OUT}$ from rectifying smoother 6, while charged voltage $V_{IN}$ on drive capacitor 12 linearly falls. However, as drive winding 2c generates drive voltage proportional to voltage induced on secondary winding 2b of transformer 2, auxiliary rectifying smoother 13 produces directly rising DC voltage $V_{IN}$ with elevation of DC output voltage $V_{OUT}$. Therefore, DC voltage $V_{IN}$ applied to control power source circuit 24 in control circuit 8 drops nearly to a disabling level, and then again linearly rises. Accordingly, control power source circuit 24 in control circuit 8 is operated by DC voltage $V_{IN}$ from auxiliary rectifying smoother 13 after starting. Detection signal voltage $V_{FB}$ from voltage detector 7 also linearly rises from zero volt with elevation of DC output voltage $V_{OUT}$ from rectifying smoother 6 on the secondary side.

When voltage level of detection signal $V_{FB}$ from output voltage detector 7 becomes higher than reference voltage $V_{RC}$ of power source 16, and divided voltage $V_{OCP}$ reaches voltage level of detection signal $V_{FB}$ from output voltage detector 7, mode control comparator 20 produces signal $V_2$ of high voltage level H. While over-current restricting comparator 19 produces signal $V_1$ of low voltage level L, OR gate 21 produces logic sum signal $V_3$ of high voltage level H to reset input terminal R of RS flip flop 23 to switch RS flip flop 23 to the reset condition. Accordingly, RS flip flop 23 forwards drive signal $V_G$ of low voltage level L to gate terminal of MOS-FET 3 to turn MOS-FET 3 off, thereby causing drain current $I_D$ through MOS-FET 3 to fall to nearly zero. At this time, output current $I_{OUT}$ from secondary winding 2b of transformer 2 flows to load not shown through rectifying smoother 6, and then linearly increases. Subsequently, when DC output voltage $V_{OUT}$ from rectifying smoother 6 reaches a detection voltage determined by various constants of each element which forms voltage detector 7, the operation moves from starting condition to normally operating condition to make all of DC voltage $V_{IN}$ from auxiliary rectifying smoother 13, DC output voltage $V_{OUT}$ and output current $I_{OUT}$ from rectifying smoother 6 substantially constant. The above detection signal is expressed by a formula: $\{(R_1+R_2)/R_2\} \times (V_Z+V_{BE})$ [V] wherein a fraction: $R_2/(R_1+R_2)$ denotes a divided ratio of dividing resistors between output terminals; $V_Z$ denotes a Zener voltage of a Zener diode; $V_{BE}$ denotes a voltage between base and emitter terminals of a NPN transistor on the order of 0.6 to 0.7 volt.

Under the normal load condition, RS flip flop 23 produces drive signals of high voltage level H shown in FIG. 4(B) to gate terminal of MOS-FET 3 to turn MOS-FET 3 on so that linearly increasing drain current $I_D$ flows through MOS-FET 3, and simultaneously divided voltage $V_{OCP}$ linearly decreases as shown in FIG. 4(D). Here, as voltage level of detection signal $V_{FB}$ from output voltage detector 7 is lower than reference voltage level $V_{DT}$ of power source 26 under the normal load condition as shown in FIG. 4(D), divided voltage $V_{OCP}$ falls beneath reference voltage level $V_{DT}$ of power source 26 to voltage level of detection signal $V_{FB}$ from output voltage detector 7, and accordingly, current detection comparator 27 produces current detection signal $V_{CP}$ of high voltage level H. Further, when divided voltage $V_{OCP}$ reaches voltage level of detection signal $V_{FB}$ from output voltage detector 7, current mode controlling comparator 20 produces signal $V_2$ of high voltage level H. At this moment, while over-current control comparator 19 produces signal $V_1$ of low voltage current L, OR gate 21 forwards logical sum signal $V_3$ of high voltage level H to reset terminal R of RS flip flop 23 to reset it. Therefore, RS flip flop 23 provides gate terminal of MOS-FET 3 with drive signal $V_G$ switched from high voltage level H to low voltage level L to turn MOS-FET 3 from on to off, causing drain current $I_D$ through MOS-FET 3 to drop to substantially zero as shown in FIG. 4(A). At this time, trailing edge (shown by arrows in FIG. 4(B)) of drive signal $V_G$ is given to clock input terminal CLK of D-flip flop 28, and simultaneously, current detection comparator 27 furnishes signal input terminal D of D-flip flop 28 with current detection signal $V_{CP}$ of high voltage level H to keep signal $V_{LD}$ from output terminal Q on high voltage level H as shown in FIG. 4(C). Accordingly, pulse generator 22 produces pulse signals $V_4$ of shorter cycle to reduce off-period of MOS-FET 3 and increase oscillation frequency.

When load not shown becomes light, DC output voltage $V_{OUT}$ from rectifying smoother 6 on the secondary side increases, and voltage of detection signal $V_{FB}$ from output voltage detector 7 linearly rises above reference voltage level $V_{DT}$ of power source 26. If RS flip flop 23 provides gate terminal of MOS-FET 3 with drive signal $V_G$ of high voltage level H shown in FIG. 4(B) to turn MOS-FET 3 on, drain current $I_D$ passes through MOS-FET 3 and directly increases, and at the same time, divided voltage $V_{OCP}$ linearly drops to voltage level of detection signal $V_{FB}$ from output voltage detector 7. Here, as voltage level of detection signal $V_{FB}$ from output voltage detector 7 under the light load condition is higher than reference voltage $V_{DT}$ of power source 26, divided voltage $V_{OCP}$ does not reach reference voltage $V_{DT}$ of power source 26 to generate current detection signal $V_{CP}$ of low voltage level from current detection comparator 27. When divided voltage $V_{OCP}$ reaches voltage level of detection signal $V_{FB}$ from output voltage detector 7 as understood from FIG. 4(D), current mode controlling comparator 20 produces an output signal $V_2$ of high voltage level H. In another aspect, since over-current control comparator 19 sends a signal $V_1$ of low voltage level L to OR gate 21 which then outputs logical sum signal $V_3$ of high voltage level to reset terminal R of RS flip flop 23 to reset it. Accordingly, as shown in FIG. 4(B), RS flip flop 23 switches drive signal $V_G$ from high voltage level H to low voltage level L to gate terminal of MOS-FET 3 to turn MOS-FET 3 from on to off, thereby causing drain current $I_D$ through MOS-FET 3 to drop to nearly zero. At this moment, as D-flip flop 28 receives drop or trailing edge (shown by an arrow) of drive signal $V_G$ shown in FIG. 4(B) at clock input terminal CLK and simultaneously current detection signal $V_{CP}$ of low voltage level L from current detection comparator 27 at signal input terminal D, it switches signal $V_{LD}$ from output terminal Q from high voltage level H to low voltage level L to elongate cycle of pulse signal $V_4$ from pulse generator 22 for off-period extension of MOS-FET 3 and reduction of oscillation frequency.

In this embodiment, at the transitional time from turning-on to -off of MOS-FET 3, D-flip flop 28 can produce its signals $V_{LD}$ of correct voltage level to precisely and certainly appreciate on the primary side of transformer 2 the load condition on the secondary side of transformer 2 based on output signals of current detector 9 without any erroneous appreciation resulted from capacitive short-circuit current such as surge current which may occur at the time of turning on of MOS-FET 3. Also, the power source is advantageous in that the appreciation on the load condition is almost immune to foreign noise such as inductive noise. In addition, under the light load condition wherein a small amount of drain current $I_D$ flows through primary winding 2a of transformer 2 or MOS-FET 3, D-flip flop 28 produces output signals $V_{LD}$ of low voltage level L to extend occurrence cycle of pulse signals $V_4$ of pulse generator 22. This allows off-period of MOS-FET 3 to extend and oscillation frequency of drive signals $V_G$ to gate terminal of MOS-FET 3 to decrease, thereby causing switching number of MOS-FET 3 to lessen switching loss under the light load condition and improve conversion efficiency of the switching power source in a wide load fluctuation range.

Figure 5:
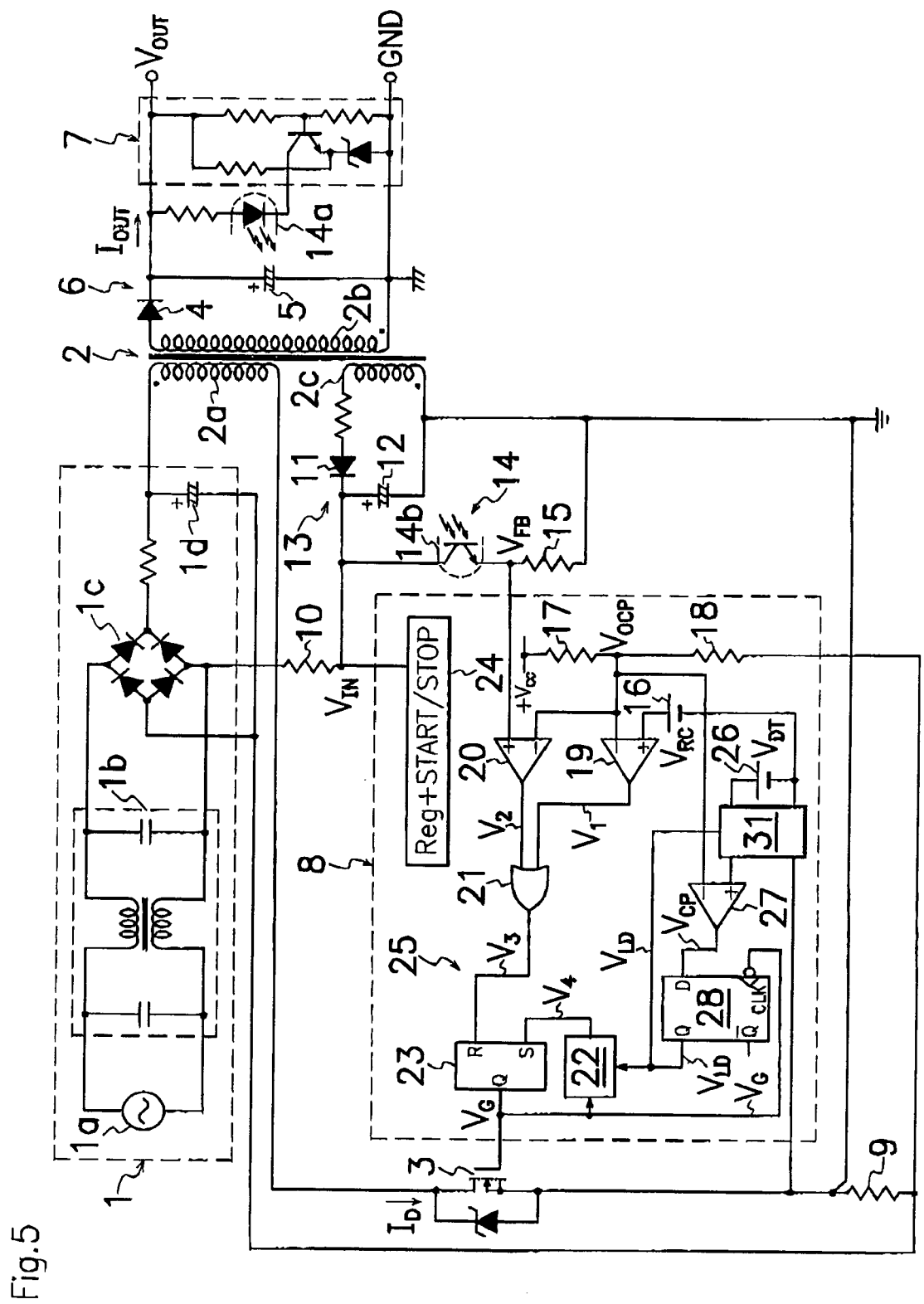
FIG. 5 is an electric circuitry showing a second embodiment according to the present invention.
Figure 6:
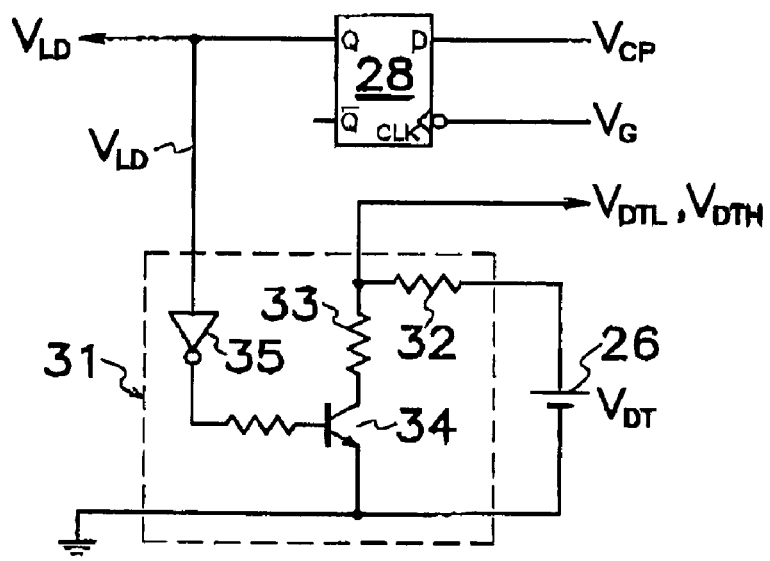
FIG. 6 is an electric circuit diagram showing a voltage adjuster of FIG. 5.

The foregoing embodiments can be varied. For example, FIG. 5 illustrates a varied embodiment of the DC-DC converter of separately excited flyback type which comprises a voltage level adjuster 31 provided in control circuit 8 as a voltage level adjusting means for changing reference voltage level $V_{DT}$ of power source 26 in the same direction as that for movement of a peak value of divided voltage $V_{OCP}$ when D-flip flop 28 switches voltage level of output signal $V_{LD}$. As shown in FIG. 6, voltage level adjuster 31 comprises a first dividing resistor 32 whose one end is connected to a positive electrode of reference power source 16; a second dividing resistor 33 and NPN transistor 34 connected in series between the other end of first dividing resistor 32 and a negative electrode of reference power source 16; and an inverter 35 connected between an output terminal Q of D-flip flop 28 and a base terminal of NPN transistor 34. When under the heavy or normal load condition, D-flip flop 28 produces output signal $V_{LD}$ of high voltage level H as shown in FIG. 8(C), a junction of dividing resistors 32 and 33 produces reference voltage $V_{DTH}$ of high voltage level shown in FIG. 8(D) with NPN transistor 34 in the off condition. Then, when D-flip flop 28 has changed output signal $V_{LD}$ from high voltage level H to low voltage level L, NPN transistor 34 is turned on to produce a low level reference voltage $V_{DTL}$ shown in FIG. 8(D) from junction of dividing resistors 32 and 33. When load has become light, and D-flip flop 28 has changed output signal $V_{LD}$ from high voltage level H to low voltage level L as shown in FIG. 8(C), low level period of drive signals $V_G$ is extended as shown in FIG. 8(B) to reduce oscillation frequency, and as a result, drain current $I_D$ flows through MOS-FET 3 with the slightly rising peak value. In association with this, negative peak values of divided voltage $V_{OCP}$ slightly moves downward. At the moment, NPN transistor 34 of voltage level adjuster 31 is turned on, and junction voltage of first and second dividing resistors 32 and 33 is switched from high voltage level $V_{DTH}$ to low voltage level $V_{DTL}$ as shown in FIG. 8(D) to stabilize voltage level of output signals $V_{LD}$ from D-flip flop 28 after the switching and stably shift oscillation mode of MOS-FET 3 at the time of load transition.

Figure 7:
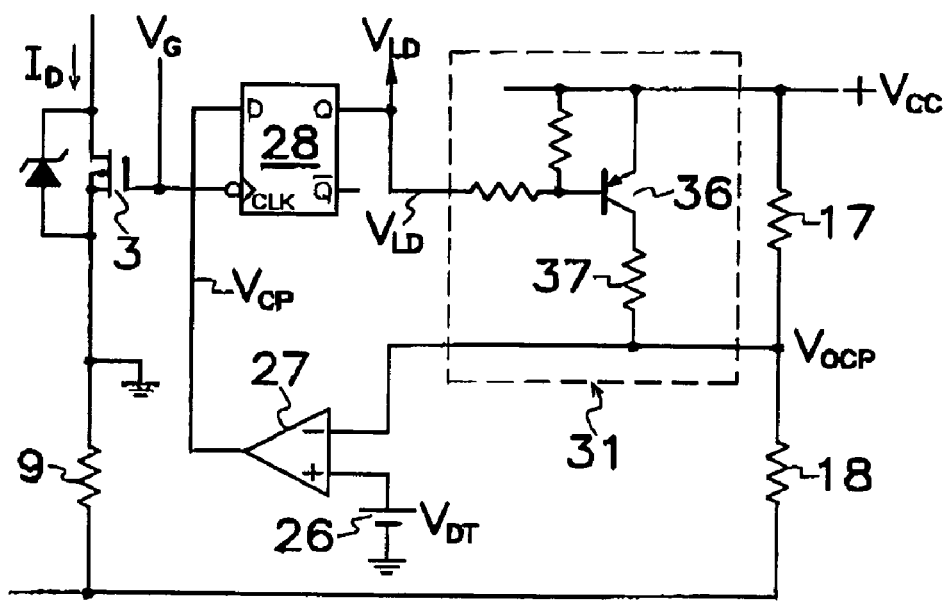
FIG. 7 is an electric circuit diagram showing another embodiment of the voltage adjuster.
Figure 8:
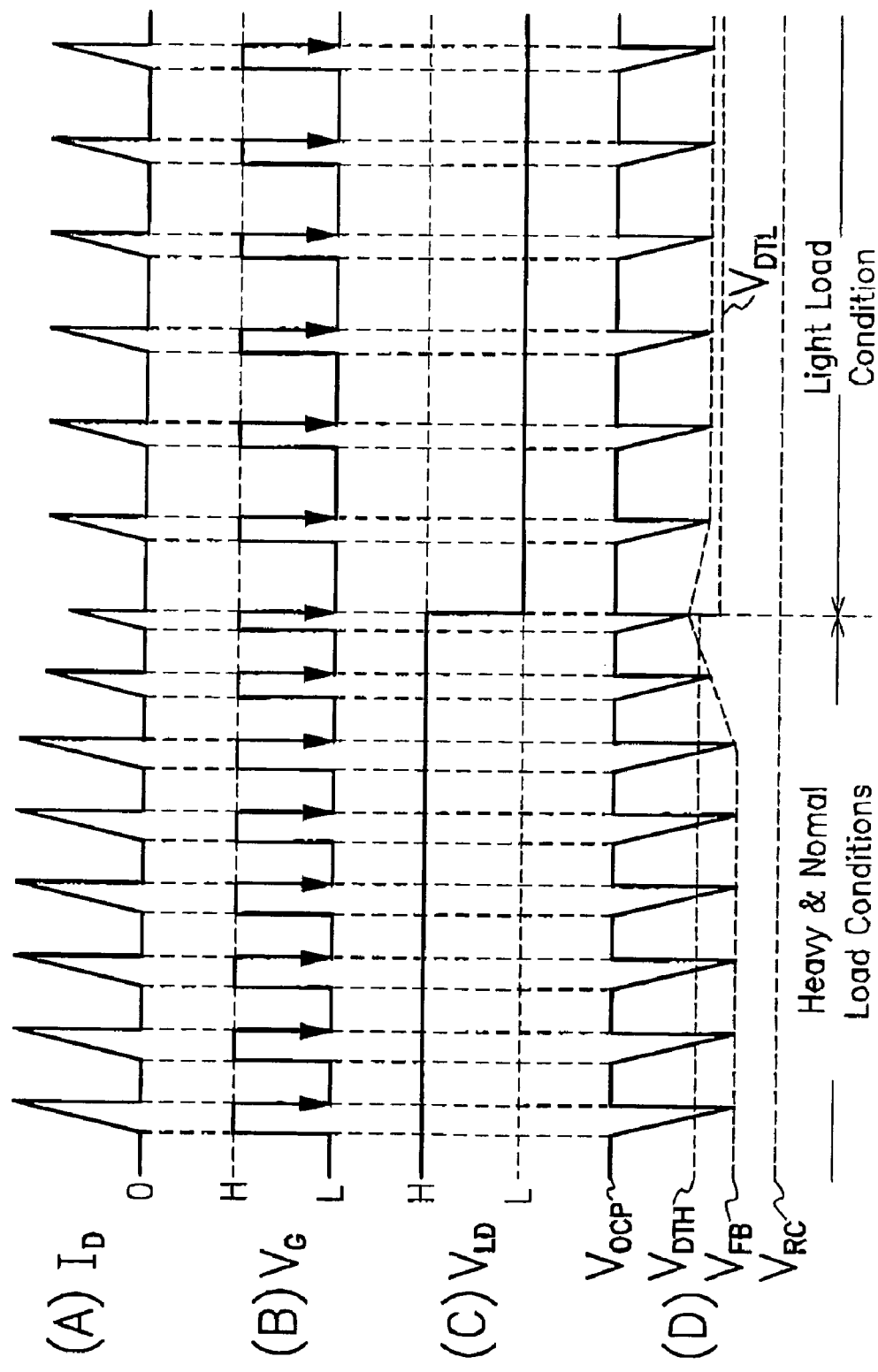
FIG. 8 is a time chart indicating an electric current and voltages for various points in the circuit shown in FIG. 5.

FIG. 7 shows another embodiment of voltage level adjuster 31 for changing voltage $V_{OCP}$ in the adverse direction from that of peak level movement of divided voltage $V_{OCP}$ when D-flip flop 28 switches voltage level of output signals $V_{LD}$. Voltage level adjuster 31 comprises a PNP transistor 36 and a resistor 37 connected in series between both ends of level-shifting resistor 7 to raise divided voltage $V_{OCP}$ when D-flip flop 28 supplies base terminal of PNP transistor 36 with output signal $V_{LD}$ of low voltage level. Specifically, if the situation has changed to the light load condition such that D-flip flop 28 switches output signal $V_{LD}$ from high voltage level H to low voltage level L, PNP transistor 36 is turned on to feed electric current through level-shifting resistor 17 and resistor 37 in parallel, thereby increasing divided voltage $V_{OCP}$. Accordingly, similarly to the embodiment shown in FIG. 6, voltage level adjuster 31 also shown in FIG. 7 enables D-flip flop 28 to stabilize voltage level of output signals $V_{LD}$ and stably shift oscillation mode of MOS-FET 3 at the time of load change.

Figure 9:
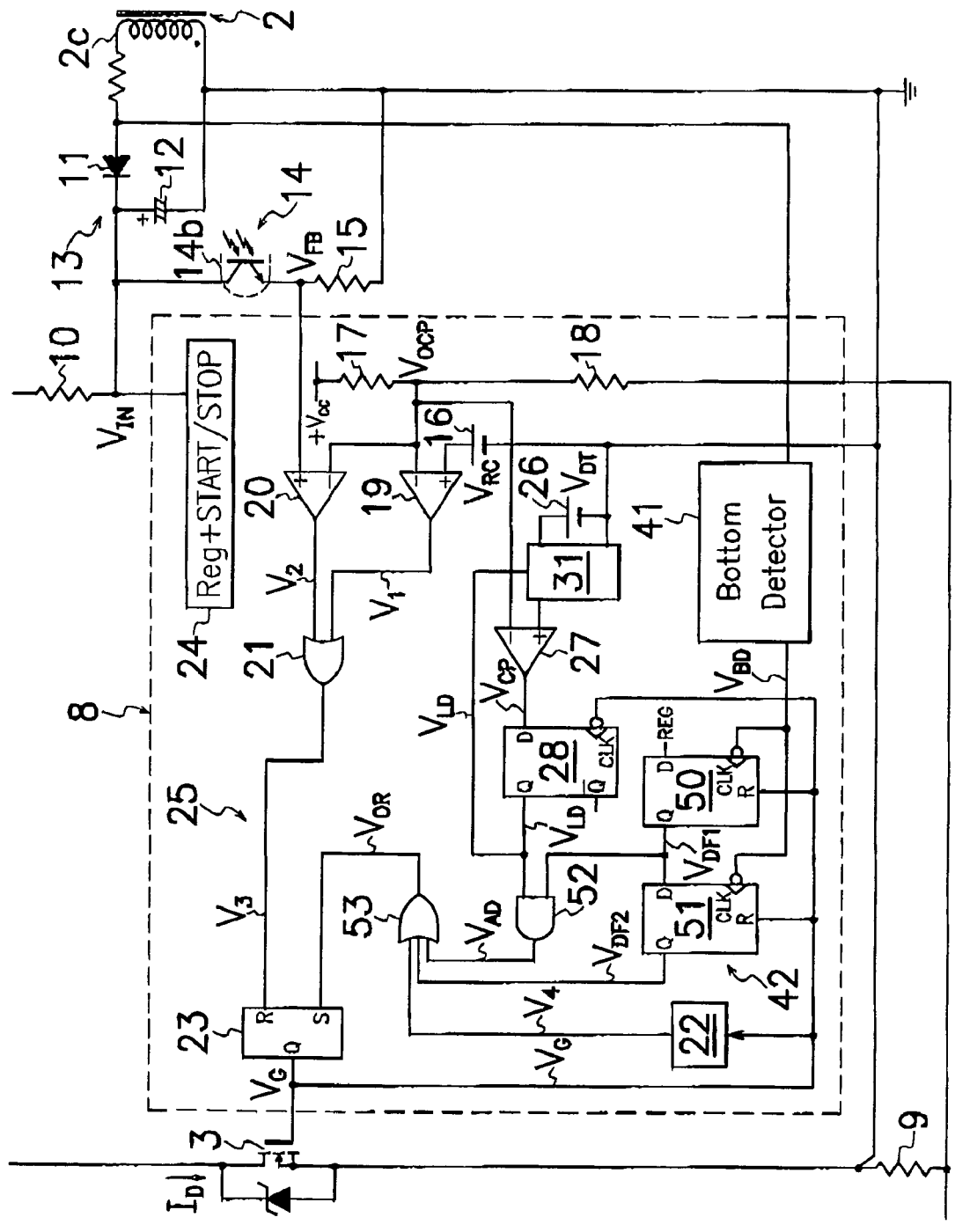
FIG. 9 is an electric circuit diagram of a control circuit according to a third embodiment of the present invention.
Figure 10:
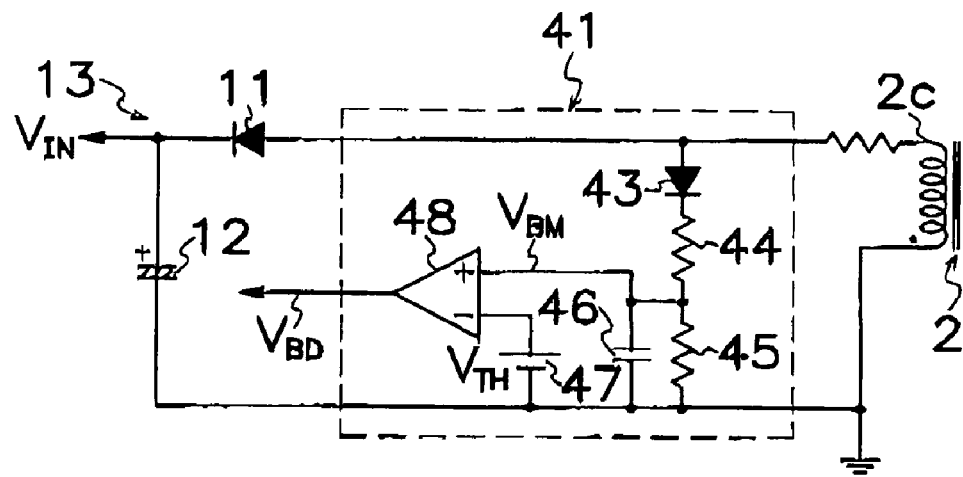
FIG. 10 is an electric circuit diagram of a bottom detector shown in FIG. 9.
Figure 11:
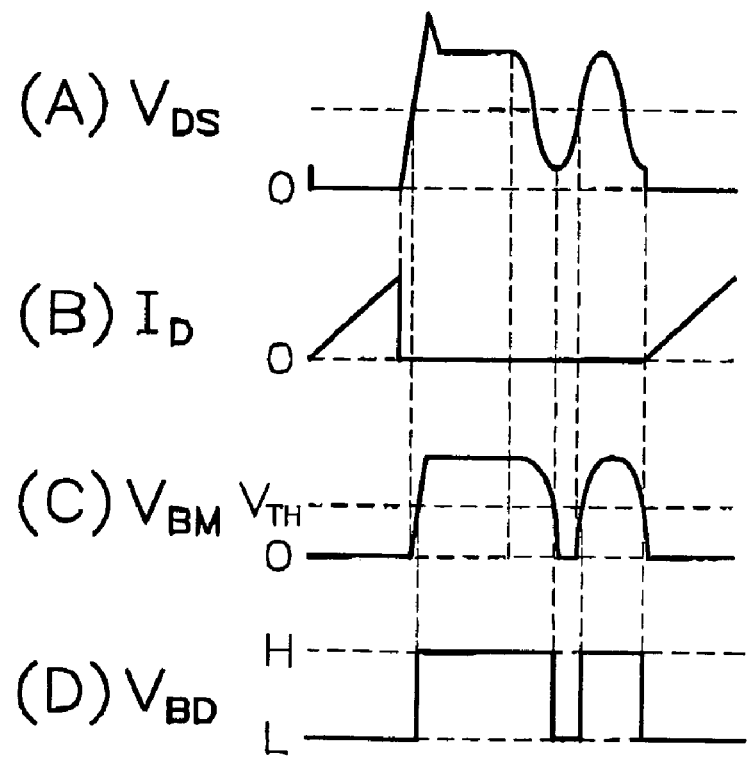
FIG. 11 is a waveform diagram showing electric signals for various points in the bottom detector shown in FIG. 10 with a voltage between drain and source terminals of a MOS-FET under the light load condition.

FIG. 9 illustrates a control circuit 8 similar to that provided in DC-DC converter of separately excited flyback type shown in FIG. 5 except that control circuit 8 of FIG. 9 comprises a bottom detecting circuit 41 as a bottom detection means for detecting minimum levels of voltage $V_{DS}$ between drain and source terminals of MOS-FET 3 during the off-period of MOS-FET 3; and a skip control circuit 42 as a skip control means for turning MOS-FET 3 on at the time bottom detecting circuit 41 finds a first minimum level of voltage $V_{DS}$ when D-flip flop 28 produces output voltage $V_{LD}$ of high voltage level H, and also for turning MOS-FET 3 off at the time bottom detecting circuit 41 finds a second minimum level of voltage $V_{DS}$ when D-flip flop 28 produces output voltage $V_{LD}$ of low voltage level. As illustrated in FIG. 10, bottom detecting circuit 41 comprises a diode 43 and voltage dividing resistors 44 and 45 connected in series between both ends of drive winding 2c of transformer 2; a capacitor 46 connected in parallel to resistor 45; a reference power source 47 for providing a threshold voltage $V_{TH}$; and a comparator 48 for generating output $V_{BD}$ of low voltage level L and high voltage level H respectively when charged voltage $V_{BM}$ of capacitor 46 is lower than and higher than threshold voltage $V_{TH}$ of reference power source 47. In other words, bottom detecting circuit 41 of FIG. 10 provides a waveform shaping means for transforming, into shapes shown in FIG. 11(C) through diode 43, resistors 44 and 45 and capacitor 46, ringing voltages similar in shape to voltages $V_{DS}$(FIG. 11(A)) between drain and source terminals of MOS-FET 3 which appear on drive winding 2c of transformer 2 during the off-period of MOS-FET 3; and moreover transforming the waveform of FIG. 11(C) into pulse array voltages $V_{BD}$ shown in FIG. 11(D) by comparing changed voltage $V_{BM}$ in capacitor 46 shown in FIG. 11(C) with threshold voltage $V_{TH}$ of reference power source 47 by means of comparator 48. In this way, minimum level of voltage $V_{DS}$ between drain and source terminals of MOS-FET 3 can be detected in the form of trailing or drop edges of pulse array voltage $V_{BD}$ produced from comparator 48.

Figure 12:
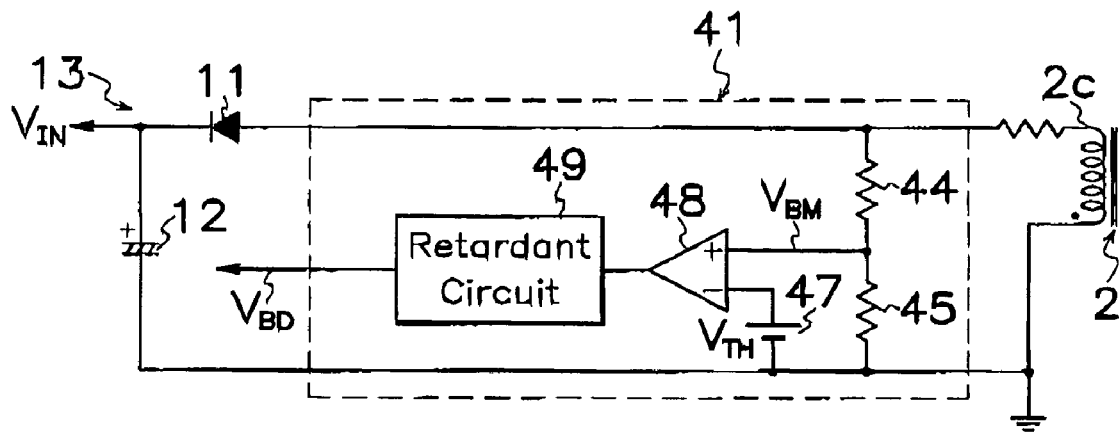
FIG. 12 is an electric circuit diagram showing another embodiment of the bottom detector in FIG. 9.
Figure 13:
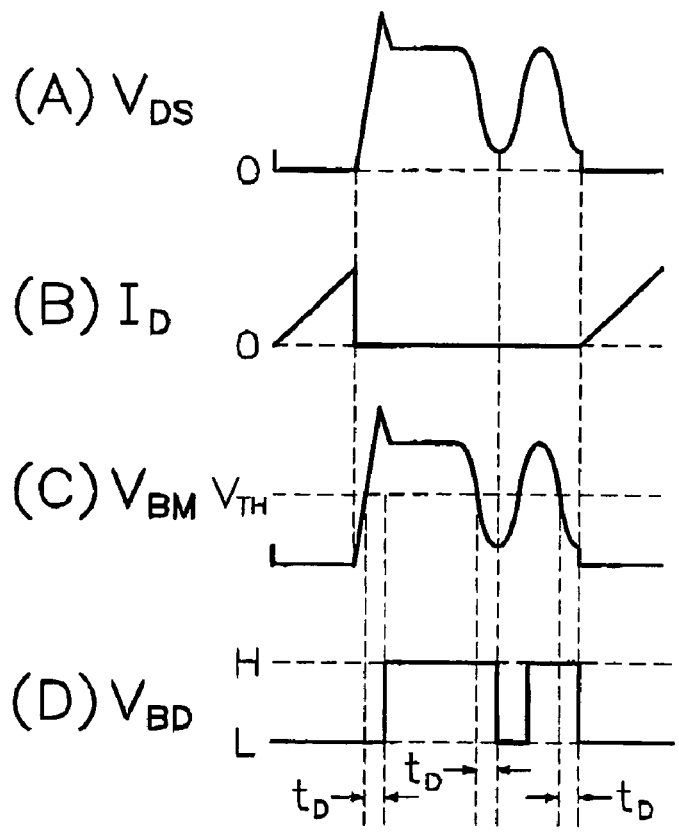
FIG. 13 is a waveform diagram showing electric signals for various points with a voltage between drain and source terminals of the MOS-FET under the light load condition.
Figure 14:
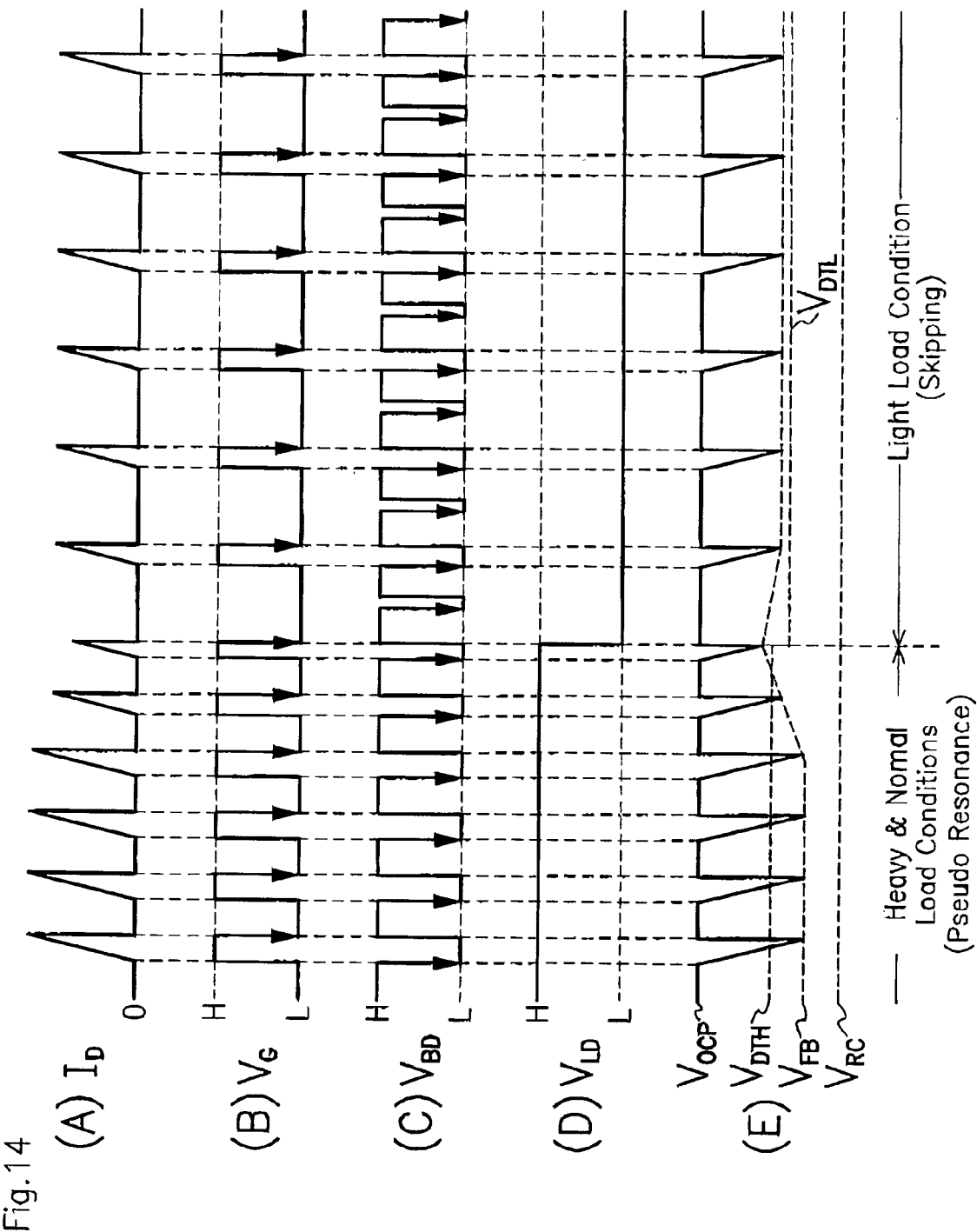
FIG. 14 is a time chart indicating an electric current and voltages for various points in the circuit shown in FIG. 9.

On the other hand, bottom detecting circuit 41 may be designed as shown in FIG. 12 to include voltage dividing resistors 44 and 45 connected to both ends of drive winding 2c of transformer 2; a reference power source 47 for providing a threshold voltage $V_{TH}$; a comparator 48 for producing output $V_{BD}$ of low voltage level L and high voltage level H respectively when divided voltage $V_{BM}$ on junction of resistors 44 and 45 is lower and higher than level of threshold voltage $V_{TH}$ of reference power source 47; and a retardant circuit 49 for delaying pulse array voltage $V_{BD}$ from comparator 48 by a period of time $t_D$. Specifically, in bottom detecting circuit 41 shown in FIG. 12, voltage dividing resistors 44 and 45 divides ringing voltages similar in shape to voltages $V_{DS}$(FIG. 13(A)) between drain and source terminals of MOS-FET 3 which appear on drive winding 2c of transformer 2 during the off-period of MOS-FET 3; comparator 48 compares voltage $V_{BM}$ with threshold voltage $V_{TH}$ of power source 47 to transform voltages $V_{DS}$ of FIG. 13A into pulse array voltages $V_{BD}$ shown in FIG. 13(D); and retardant circuit 49 delays pulse array voltages $V_{BD}$ from comparator 48 by a period of time $t_D$ to synchronize trailing edge of pulse array voltage $V_{BD}$ from comparator 48 with minimum level of voltage $V_{DS}$ between drain and source terminals of MOS-FET 3 as shown in FIG. 13(A) to 13(D). In this way, bottom detecting circuit 41 enables detection of a minimum point on voltage $V_{DS}$ between drain and source terminals of MOS-FET 3 in the form of trailing edge of pulse array voltage $V_{BD}$ from comparator 48.

As shown in FIG. 9, skip control circuit 42 involves first and second D-flip flops 50 and 51 each which has a reset terminal R for resetting them by rising edge of drive signals for MOS-FET 3. Output signals $V_{BD}$ from bottom detecting circuit 41 are given to each clock input terminal CLK of first and second D-flip flops 50 and 51; an input terminal D of first D-flip flop 50 is retained on high voltage level (REG); an input terminal D of second D-flip flop 51 is connected to output terminal Q of first D-flip flop 50; and input terminals of OR gate 53 are connected to output terminal Q of second D-flip flop 51, output terminals of pulse generator 22 and AND gate 52. One input terminal of AND gate 52 is connected to output terminal Q of first D-flip flop 50, and the other input terminal of AND gate 52 is connected to output terminal Q of D-flip flop 28. An output terminal of OR gate 53 is connected to a set terminal S of RS flip flop 23. First D-flip flop 50 produces output signal $V_{DF1}$ of high voltage level H synchronously with trailing edge of a first output signal $V_{BD}$ from bottom detecting circuit 41 to clock input terminals CLK. Second D-flip flop 51 produces output signal $V_{DF2}$ of high voltage level H synchronously with trailing edge of a second output signal $V_{BD}$ from bottom detecting circuit 41 to clock input terminals CLK. In skip control circuit 42 shown in FIG. 9, under the heavy and normal load conditions, D-flip flop 28 produces output signal $V_{LD}$ of high voltage level H, and first D-flip flop 50 produces output signal $V_{DF1}$ of high voltage level H synchronously with trailing edge of a first output signal $V_{BD}$ from bottom detecting circuit 41 to clock input terminal CLK of first D-flip flop 50 to produce output signal $V_{AD}$ of high voltage level H from AND gate 52. Output signal $V_{AD}$ from AND gate 52 is supplied through OR gate 53 to set terminal S of RS flip flop 23 to provide gate terminal of MOS-FET 3 with drive signal $V_G$ of high voltage level H. Accordingly, under the heavy and normal load conditions, MOS-FET 3 can be turned on at the first minimum point on voltage detected by bottom detecting circuit 41. To the contrary, since D-flip flop 28 produces output signal $V_{LD}$ of low voltage level L under the light load condition, AND gate 52 produces output signal $V_{AD}$ of low voltage level L which can never turn RS flip flop 23 to the set condition. Meanwhile, since second D-flip flop 51 changes output signal $V_{DF2}$ to high voltage level H synchronously with trailing edge of a second output signal $V_{BD}$ from bottom detecting circuit 41 to clock input terminal CLK of second D-flip flop 51, output signal $V_{DF2}$ is supplied through OR gate 53 to set terminal S of RS flip flop 23 to provide gate terminal of MOS-FET 3 with drive signal $V_G$ of high voltage level H. For that reason, MOS-FET 3 can be turned on at the second minimum point on voltage detected by bottom detecting circuit 41 under the light load condition.

In operation of DC-DC converter of separately excited flyback type shown in FIG. 9, during the heavy and normal load period, D-flip flop 28 produces output signal $V_{LD}$ of high voltage level H as shown in FIG. 14(D), and simultaneously, first D-flip flop 50 of skip control circuit 42 produces a single pulsatile signal $V_{DF1}$ from output terminal Q synchronously with a first trailing edge of output signal $V_{BD}$ from bottom detecting circuit 41 as shown in FIG. 14(C). Accordingly, in synchronization with the first trailing edge of output signal $V_{BD}$ from bottom detection circuit 41, AND gate 52 produces a single pulsatile logical sum signal $V_{AD}$ of high voltage level. Also, as second D-flip flop 51 of skip control circuit 42 produces signal $V_{DF2}$ of low voltage level L at output terminal Q, OR gate 53 sends a single pulsatile logical sum signal $V_{OR}$ of high voltage level H to RS flip flop 23, synchronously with a first trailing edge of output signal $V_{BD}$ from bottom detecting circuit 41 to switch RS flip flop 23 to the set condition. As a result, as shown in FIGS. 14(C) and 14(B), RS flip flop 23 changes drive signal $V_G$ from low voltage level L to high voltage level H to gate terminal of MOS-FET 3 in synchronization with a first trailing edge of output $V_{BD}$ from bottom detecting circuit 41 to turn MOS-FET 3 on. At the moment, as shown in FIG. 14(A), linearly increasing drain current $I_D$ flows through MOS-FET 3, and simultaneously divided voltage $V_{OCP}$ linearly falls under reference voltage $V_{DTH}$ of high level as shown in FIG. 14(E). When divided voltage $V_{OCP}$ reaches a voltage level of detection signal $V_{FB}$ from voltage detecting circuit 7, current mode control comparator 20 produces a signal $V_2$ of high voltage level to reset RS flip flop 23. Thus, RS flip flop 23 switches drive signal $V_G$ from high voltage level H to low voltage level L to gate terminal of MOS-FET 3 as shown in FIG. 14(B) to turn MOS-FET 3 off. In other words, under the heavy and normal load conditions and during the off-period of MOS-FET 3, flyback energy stored in transformer 2 is discharged to the end, and when voltage $V_{DS}$ between drain and source terminals reaches every minimum voltage point (bottom point), MOS-FET 3 is turned on to perform pseudo resonance.

When load becomes light so that D-flip flop 28 switches output signal $V_{LD}$ from high voltage level H to low voltage level L, drain current $I_D$ through MOS-FET 3 slightly raises the maximum value as shown in FIG. 14(A), and at the same time, divided voltage $V_{OCP}$ slightly lowers the negative peak. Just then, voltage regulator 31 changes the reference voltage to non-inverted input terminal (+) of current detecting comparator 27 from high level $V_{DTH}$ to low level $V_{DTL}$. Moreover, second D-flip flop 51 of skip control circuit 42 produces a single pulsatile signal $V_{DF2}$ at output terminal Q synchronously with a second trailing edge of output signal $V_{BD}$ shown in FIG. 14(C) from bottom detection circuit 41. Also, although AND gate 52 produces signal $V_{AD}$ of low voltage level L, OR gate 53 produces single pulsatile logical sum signal $V_{OR}$ of high voltage level synchronously with single pulsatile signal $V_{DF2}$ from D-flip flop 51 to set RS flip flop 23. Accordingly, RS flip flop 23 changes drive signal $V_G$ from low voltage level L to high voltage level H to gate terminal of MOS-FET 3 synchronously with the second trailing edge of output signal $V_{BD}$ from bottom detection circuit 41 as shown in FIGS. 14(B) and 14(C) to turn MOS-FET 3 on. Thus, linearly increasing drain current flows through MOS-FET 3 as shown in FIG. 14(A), and simultaneously divided voltage $V_{OCP}$ linearly decreases. At the moment, as detection signal $V_{FB}$ from output voltage detector 7 is higher than reference voltage $V_{DTL}$ of low voltage level, divided voltage $V_{OCP}$ does not reach reference voltage level $V_{DTL}$. When divided voltage $V_{OCP}$ reaches detection signal $V_{FB}$ from output voltage detector 7, current mode control comparator 20 produces output signal $V_2$ of high voltage level H to reset RS flip flop 23. Accordingly, as shown in FIG. 14(B), RS flip flop 23 changes drive signal $V_G$ from high voltage level H to low voltage level L to gate terminal of MOS-FET 3 to turn MOS-FET 3 from on to off condition. In this way, under the light load condition, MOS-FET 3 is turned on as "bottom skipping" at the second minimum voltage point or at every other minimum voltage point of voltage $V_{DS}$ between drain and source terminals which occurs during the off-period of MOS-FET 3.

Figure 15:
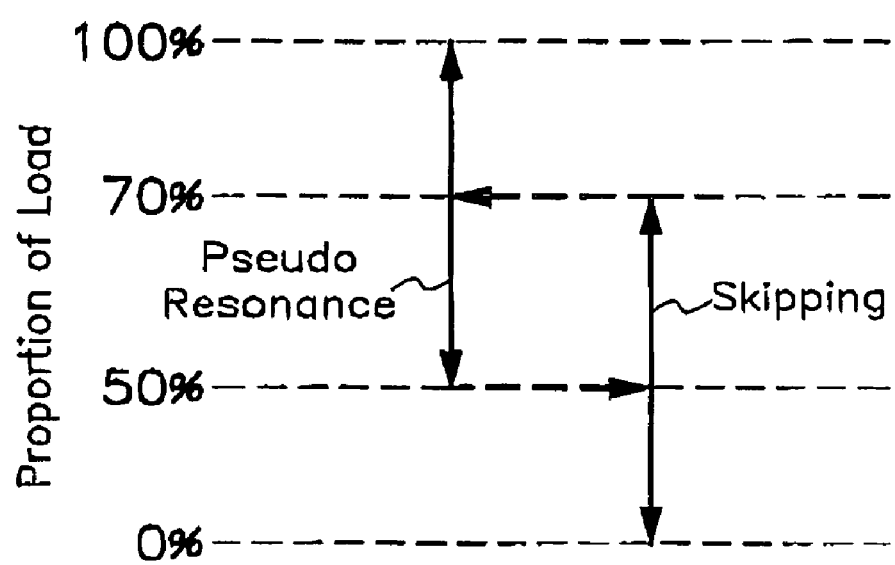
FIG. 15 is a graph showing hysteretic characteristics under oscillation with load proportion.

FIG. 15 shows a transitional diagram of oscillation to load proportion in the DC-DC converter of separately excited flyback type. The term "load proportion" means a proportion of power consumed by load to power which the converter can output to load. 50 to 100% of load proportion means the normal and heavy load conditions involving the pseudo resonance, while 0 to 70% of load proportion means the normal and light load conditions involving the bottom skipping. When load becomes light with the load proportion falling from 100% to 50%, the converter changes from pseudo resonance to bottom skipping, and it keeps bottom skipping until unloaded condition or zero % such as standby condition for load. When load becomes heavier than the unloaded condition with the increasing load proportion from zero % to 70%, operation moves from bottom skipping to pseudo resonance which is kept under the heavy load condition or up to 100% load proportion. In this way, pseudo resonance and bottom skipping cooperate together to provide the operation in DC-DC converter with the hysteretic characteristics in the transitional graph of load proportion shown in FIG. 15. Substitution of the switching frequency reducing operation for the bottom skipping shown in FIG. 15, would be able to draw a transitional graph of oscillation for DC-DC converter shown in FIG. 5.

In the embodiment of FIG. 9, MOS-FET 3 is turned on at the second minimum voltage point of voltage $V_{DS}$ between drain and source terminals of MOS-FET 3 under the light load condition to extend the off-period of MOS-FET 3 for reduction in switching frequency or switching number of MOS-FET 3, resulting in decrease in switching loss and improvement in conversion efficiency in a wide operation range of switching power source. In other words, as flyback energy in transformer 2 causes output current to flow from secondary winding 2b through rectifying smoother 6 to load not shown for a short period of time after MOS-FET 3 is turned off, voltage pulses $V_{DS}$ of narrow time width occur between drain and source terminals of MOS-FET 3 as shown in FIGS. 11(A) and 13(A) accompanying free oscillation components. Accordingly, MOS-FET 3 is turned on when bottom detecting circuit 41 finds a second minimum voltage point of narrow voltage pulses $V_{DS}$ under the light load condition to carry out the bottom skipping by skip control circuit 42, extending the off-period of MOS-FET 3 and reducing oscillation frequency. Also, under the heavy and normal load conditions, flyback energy in transformer 2 causes output current to flow from secondary winding 2b through rectifying smoother 6 to load for a long period of time after MOS-FET 3 is turned off, thereby resulting in voltage pulse $V_{DS}$ of wide time width between drain and source terminals of MOS-FET 3. Therefore, when skip detection circuit 41 catches a first minimum voltage point of wide voltage pulse $V_{DS}$, MOS-FET 3 is turned on by an output from skip control circuit 42 every minimum voltage point, and normal pseudo resonance is performed by switching MOS-FET 3 from the off to the on condition at the time voltage $V_{DS}$ between drain and source terminals of MOS-FET 3 reaches the minimum voltage point (bottom point) after flyback energy in transformer 2 has been discharged.

Figure 16:
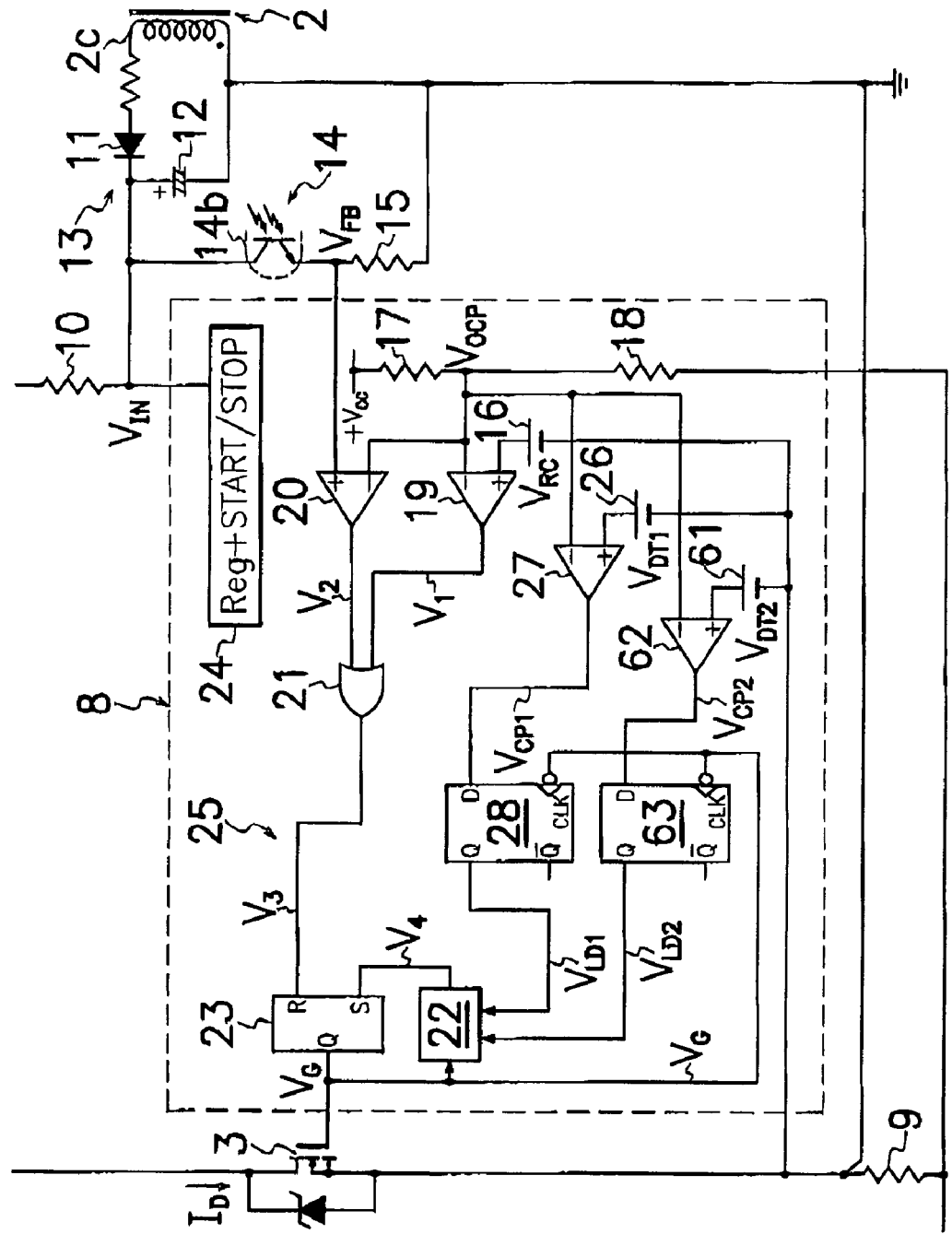
FIG. 16 is an electric circuit diagram showing a fourth embodiment according to the present invention.
Figure 17:
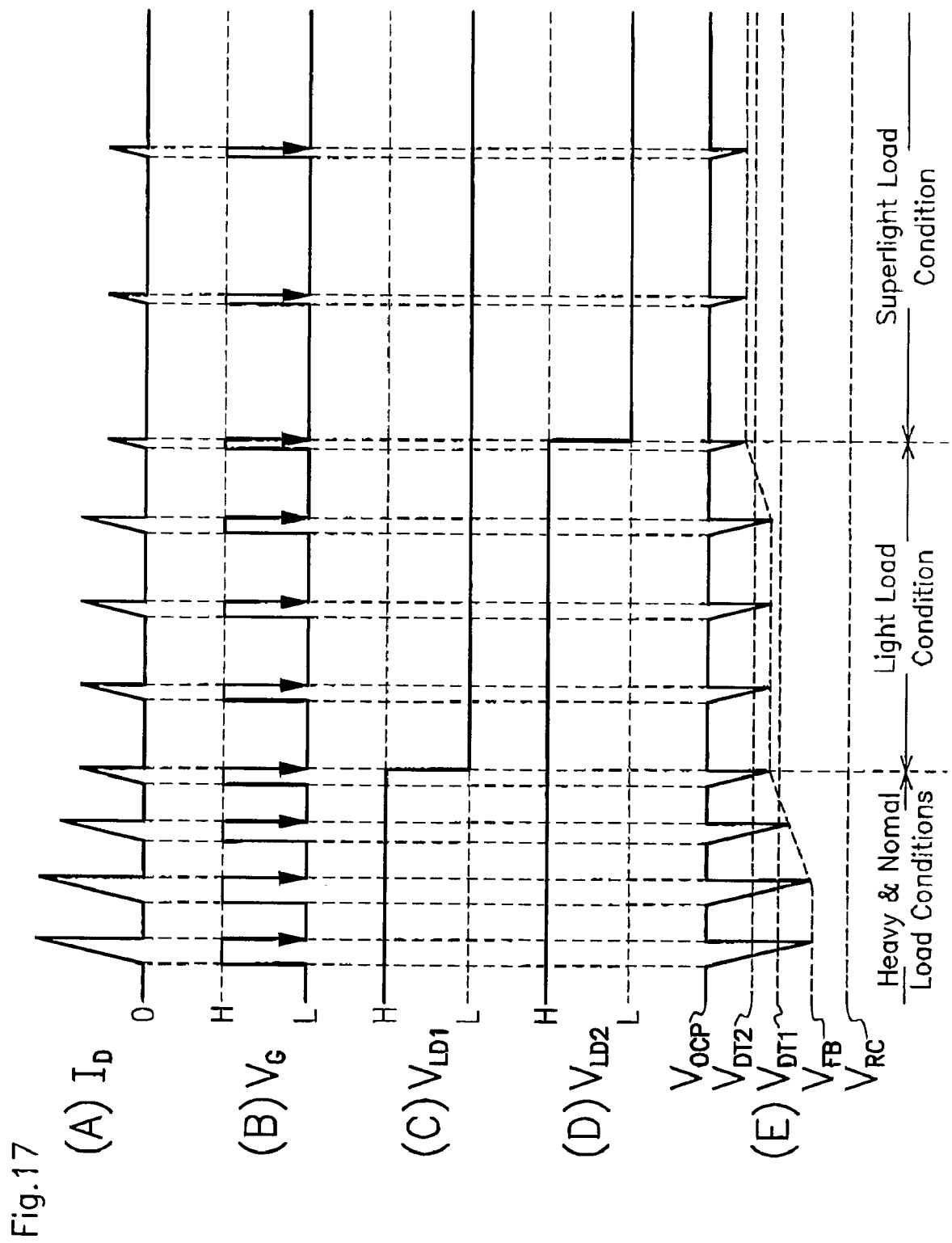
FIG. 17 is a time chart showing an electric current and voltages for various points in the circuit of FIG. 16.

FIG. 16 illustrates another embodiment of control circuit 8 used in DC-DC converter of separately excited flyback type. This control circuit 8 comprises an additional or second reference power source 61, an additional or second current detection comparator 62 and a second D-flip flop 63 in parallel to first reference power source 26, first current detection comparator 27 and first D-flip flop 28. Two current detection comparators 27 and 62 compares divided voltage $V_{OCP}$ with different reference voltages $V_{DT1}$ and $V_{DT2}$ of power sources 26 and 61 to control or vary occurrence cycle of pulse signal $V_4$ from pulse generator 22 with output signals $V_{LD1}$ and $V_{LD2}$ of low voltage level L respectively produced from two D-flip flops 28 and 63 under the light or very light load condition so that oscillation frequency of drive signals $V_G$ produced from RS flip flop 23 can be lowered to different two frequencies. For example, second reference voltage $V_{DT2}$ of second reference power source 61 can be set higher than first reference voltage $V_{DT1}$ of first reference power source 26. In this DC-DC converter, as voltage level of detection signal $V_{FB}$ from output detector 7 is lower than first reference voltage $V_{DT1}$ of first power source 26 under the heavy and normal load conditions, divided voltage $V_{OCP}$ linearly declines beneath first and second reference voltages $V_{DT1}$ and $V_{DT2}$ to the voltage level of detection signal $V_{FB}$ from output detector 7. Therefore, both of first and second current detection comparators 27 and 62 produce first and second current detection signals $V_{CP1}$ and $V_{CP2}$ of high voltage level H. Then, when divided voltage $V_{OCP}$ reaches voltage level of detection signal $V_{FB}$ as shown in FIG. 17(E), RS flip flop 23 changes drive signal $V_G$ from high voltage level H to low voltage level L to gate terminal of MOS-FET 3 as shown in FIG. 17(B) to turn MOS-FET 3 from on to off, reducing drain current $I_D$ through MOS-FET 3 to substantially zero. At this time, trailing edges shown by arrows in FIG. 17(B) are given to clock input terminal CLK of first and second D-flip flops 28 and 63, and simultaneously first and second current detection comparators 27 and 62 generate first and second current detection signals $V_{CP1}$ and $V_{CP2}$ of high voltage level H to corresponding input terminals D of first and second D-flip flops 28 and 63 to maintain first and second signals $V_{LD1}$ and $V_{LD2}$ of high voltage level H from Q output terminals of first and second D-flip flops 28 and 63 as shown in FIGS. 17(C) and 17(D). Accordingly, under the heavy and normal load conditions, pulse generator 22 produces pulse signals $V_4$ of shorter cycle to shorten the off period of MOS-FET 3 and increase oscillation frequency.

When the operation moves to the light load condition, output voltage detector 7 produces detection signals $V_{FB}$ of the voltage level higher than first reference voltage level $V_{DT1}$ of first power source 26 but lower than second reference voltage level $V_{DT2}$ of second power source 61, divided voltage $V_{OCP}$ directly falls beneath second reference level $V_{DT2}$ of second power source 61 but does not reach first reference level $V_{DT1}$ of first power source 26. Accordingly, first current detection comparator 27 produces first current detection signals $V_{CP1}$ of low voltage level L, but second current detection comparator 61 produces second current detection signals $V_{CP2}$ of high voltage level H. Subsequently, when divided voltage $V_{OCP}$ comes down to detection signal $V_{FB}$ from output voltage detector 7 as shown in FIG. 17(E), drive signals $V_G$ is switched from high voltage level H to low voltage level L as shown in FIG. 17(B) to turn MOS-FET 3 from the on to the off condition, drain current $I_D$ through MOS-FET 3 drops to substantially zero level as shown in FIG. 17(A). At the moment, trailing edge (shown by arrow) of drive signal $V_G$ of FIG. 17(B) is applied to clock input terminals CLK of D-flip flops 28 and 63, and at the same time, first current detection signal $V_{CP1}$ of low voltage level L from first current detection comparator 27 is furnished to input terminal D of first D-flip flop 28; second current detection signal $V_{CP2}$ of high voltage level H from second current detection comparator 62 is furnished to input terminal D of second D-flip flop 61; first D-flip flop 28 changes signal $V_{LD1}$ on output terminal Q from high voltage level H to low voltage level L as shown in FIG. 17(C); and second D-flip flop 63 maintains high voltage level H of output signal $V_{LD2}$ at output terminal Q as shown in FIG. 17(D). Therefore, under the light load condition, pulse generator 22 produces pulse signals $V_4$ of longer cycle to extend the off period of MOS-FET 3, reducing oscillation frequency.

When the operation moves from the light load condition to the very light or superlight load condition not heavier than the light load condition, output voltage detector 7 produces detection signals $V_{FB}$ of the voltage level higher than second reference voltage $V_{DT2}$ of second power source 61 as shown in FIG. 17(E), and therefore, divided voltage $V_{OCP}$ does not drop to second reference voltage $V_{DT2}$ of second power source 61. For that reason, both of two current detection comparators 27 and 62 produce current detection signals $V_{CP1}$ and $V_{CP2}$ of low voltage level L. When divided voltage $V_{OCP}$ reaches voltage level of detection signal $V_{FB}$ from output voltage detector 7, drive signal $V_G$ changes from high voltage level H to low voltage level L to turn MOS-FET 3 from the on condition to the off condition as shown in FIG. 17(B), reducing drain current $I_D$ through MOS-FET 3 to substantially zero level as shown in FIG. 17(A). Just then, trailing edge (shown by arrows in FIG. 17(B)) of drive signal $V_G$ is applied to clock input terminal CLK of two D-flip flops 28 and 63, and concomitantly, current detection comparators 27 and 62 supply current detection signals $V_{CP1}$ and $V_{CP2}$ of low voltage level to input terminals D of D-flip flops 28 and 63 so that first D-flip flop 28 keeps signal $V_{LD1}$ of low voltage level L on the output terminal Q as shown in FIG. 17(C), while second D-flip flop 63 changes signal $V_{LD2}$ on the output terminal Q from high voltage level H to low voltage level L. Accordingly, as pulse generator 22 under the superlight load condition produces pulse signals $V_4$ of the cycle longer than that under the light load condition, thereby causing further extension of the off period of MOS-FET 3 and further reduction in oscillation frequency compared with under the light load condition.

In the embodiment shown in FIG. 16, as oscillation frequency of drive signal $V_G$ to gate terminal of MOS-FET 3 can be reduced to different frequencies under the light and superlight load condition, conversion efficiency of the switching power source can be further improved by fine or stepwise control of oscillation frequency for drive signal $V_G$ of MOS-FET 3.

Figure 18:
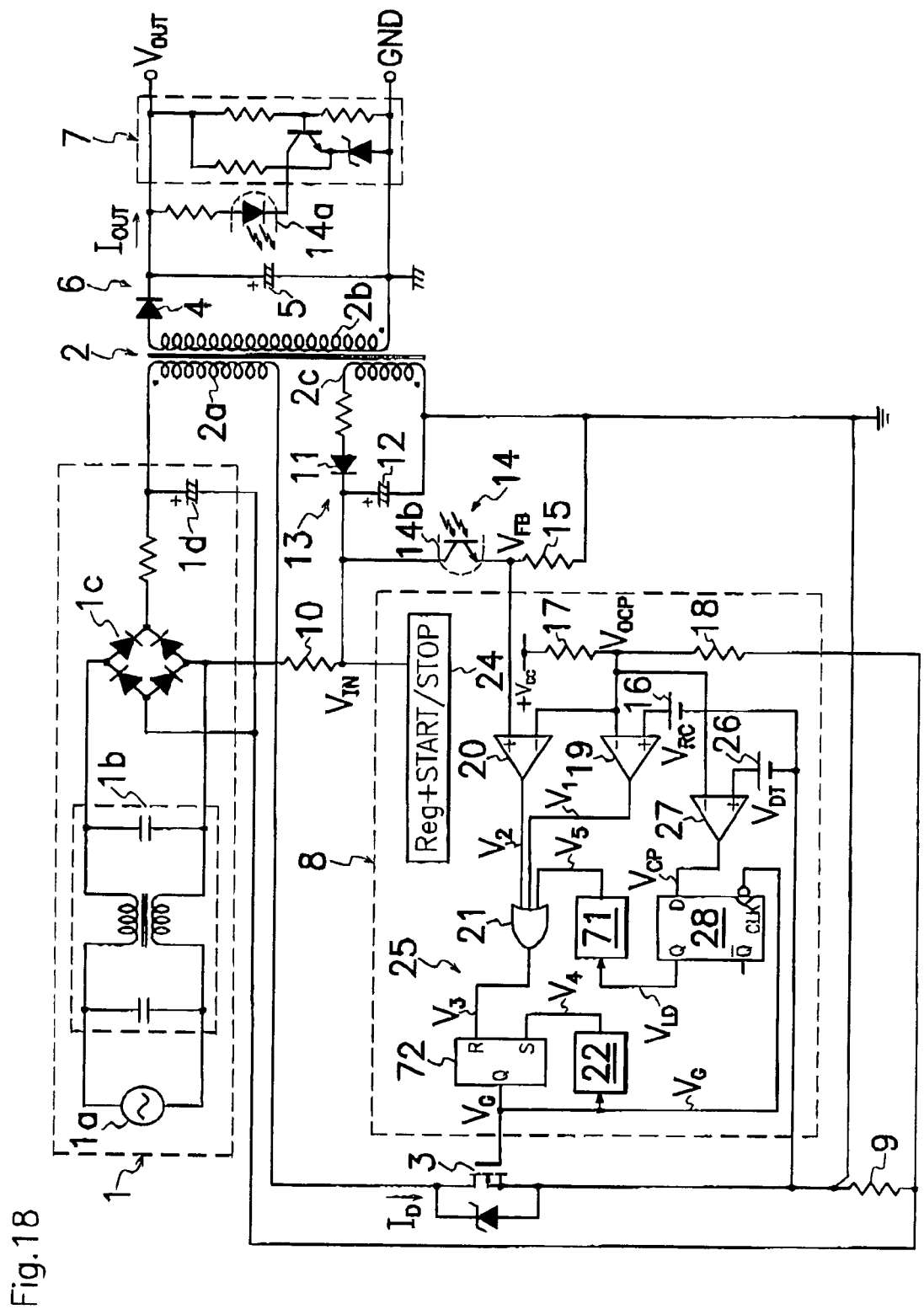
FIG. 18 is an electric circuit diagram of a fifth embodiment according to the present invention.

FIG. 18 illustrates a further DC-DC converter of separately excited flyback type according to the present invention which comprises control circuit 8 same as that shown in FIG. 2 except in that control circuit of FIG. 18 is provided with an intermittent oscillation controller 71 as an intermittent oscillation means for deactivating the on-off operation of MOS-FET 3 for a period of time $t_B$ or in a cycle much longer than an oscillation cycle of drive signal $V_G$ when D-flip flop 28 produces output signal $V_{LD}$ of low voltage level L. The embodiment of FIG. 18 utilizes a reset-priority RS flip flop 72 for preferentially producing an output on reset terminal R when input signals of high voltage level H are coincidentally applied to set and reset terminals S and R of RS flip flop 72. Receiving an output signal $V_{LD}$ of low voltage level L from D-flip flop 28 as shown in FIG. 19(C), intermittent oscillation controller 71 produces an output signal $V_5$ of high voltage level H to OR gate 21 for a period of time $t_B$ in a cycle (for example on the order of 1 to 100 milliseconds) much longer than an oscillation cycle of drive signal $V_G$ (for example on the order of 10 to 50 microseconds) when D-flip flop 28 produces output signal $V_{LD}$ of low voltage level L as shown in FIGS. 19(C) and 19(D). As OR gate 21 produces signal $V_3$ of high voltage level H during the period $t_B$ of producing signal $V_3$ of high voltage level H from intermittent oscillation controller 71 to OR gate 21, reset-priority RS flip flop 72 retains the reset condition to supply gate terminal of MOS-FET 3 with drive signal $V_G$ of low voltage level L for the period of time $t_B$. This allows change of the converter to the intermittent oscillation mode under the light load condition to keep MOS-FET 3 in the off condition during the period of time $t_B$ in a cycle much longer than oscillation cycle of drive signal $V_G$.

Figure 19:
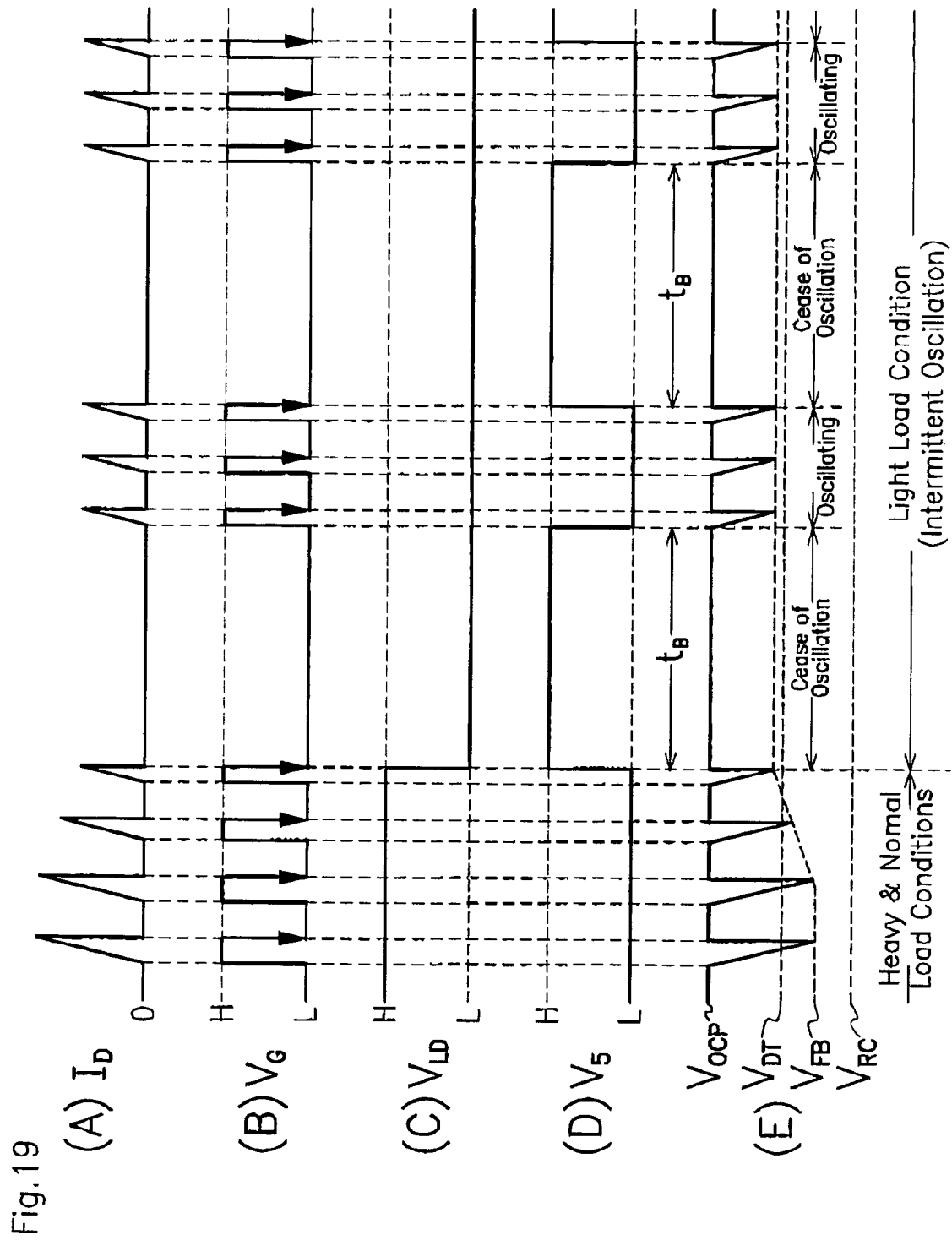
FIG. 19 is a time chart showing an electric current and voltages for various points in the circuit of FIG. 18.

In the DC-DC converter of separately excited flyback type shown in FIG. 18, drive signals $V_G$ shown in FIG. 19 are switched to high voltage level H under the heavy and normal load conditions when pulse generator 22 provides set terminal S of reset-priority RS flip flop 72 with pulse signal $V_4$ to turn MOS-FET 3 on. Therefore, drain current $I_D$ through MOS-FET 3 linearly increases as shown in FIG. 19(A), and simultaneously divided voltage $V_{OCP}$ linearly decreases under reference voltage level $V_{DT}$ of first power source 2 so that current detection comparator 27 produces current detection signal $V_{CP}$ of high voltage level H. And, when divided voltage $V_{OCP}$ comes down to detection signal level $V_{FB}$ from output voltage detector 7 as shown in FIG. 19(E), drive signal $V_G$ is changed from high voltage level H as shown in FIG. 19(B) to low voltage level L to turn MOS-FET 3 from the on to the off condition, reducing drain current $I_D$ through MOS-FET 3 to nearly zero level as shown in FIG. 19(A). At this time, trailing edge of drive signal $V_G$ shown by arrows in FIG. 19(B) is applied to clock input terminal CLK of D-flip flop 28, and coincidentally current detection comparator 27 supplies input terminal D of D-flip flop 28 with current detection signal $V_{CP}$ of high voltage level H to maintain signal $V_{LD}$ on output terminal Q of D-flip flop 28 on high voltage level as shown in FIG. 19(C). Under the circumstances, intermittent oscillation controller 71 produces output signal $V_5$ of low voltage level L as shown in FIG. 19(D) to cancel operation of intermittent oscillation controller 71 and thereby perform continuous usual oscillation.

Under the light load condition, output voltage detector 7 produces detection signal $V_{FB}$ above reference voltage $V_{DT}$ of power source 26, and therefore, divided voltage $V_{OCP}$ does not reach reference voltage $V_{DT}$ of power source 26 as shown in FIG. 19(E), so current detection comparator 27 produces current detection signal $V_{CP}$ of low voltage level. When divided voltage $V_{OCP}$ falls to detection signal $V_{FB}$ from output voltage detector 7, drive signal $V_G$ changes from high voltage level H to low voltage level L as shown in FIG. 19(A) to turn MOS-FET 3 from on to off, lowering drain current $I_D$ through MOS-FET 3 to approximately zero level. Here, trailing edge (shown by arrows in FIG. 19(B)) of drive signal $V_G$ is input to clock input terminal CLK of D-flip flop 28, and concurrently current detection comparator 27 forwards current detection signal $V_{CP}$ of low voltage level L to input terminal D of D-flip flop 28 which therefore switches output signal $V_{LD}$ on output terminal Q from high voltage level H to low voltage level L to drive intermittent oscillation controller 71. Thus, as shown in FIG. 19(D), intermittent oscillation controller 71 produces signal $V_5$ of high voltage level H during the period of time $t_B$ in a cycle much longer than oscillation cycle of drive signal $V_G$, and OR gate 21 produces signal $V_3$ of high voltage level only for the period $t_B$ to send drive signal $V_G$ of low voltage level L to gate terminal of MOS-FET 3 from reset-priority RS flip flop 72 for the period $t_B$. In this way, intermittent oscillation can be accomplished under the light load condition to cease the on-off operation of MOS-FET 3 for the period of time $t_B$ in a cycle much longer than oscillation cycle for drive signals $V_G$.

In the embodiment shown in FIG. 18, during the light load condition wherein small amount of drain current $I_D$ flows through MOS-FET 3, D-flip flop 28 produces output signal $V_{LD}$ of low voltage level L to switch the converter to the intermittent oscillation mode for deactivating the on-off operation of MOS-FET 3 for the period of time $t_B$ in a cycle much longer than oscillation cycle of drive signal $V_G$ by means of intermittent oscillation controller 71, and this allows extreme decrement of switching operation number by MOS-FET 3. Accordingly, the converter is advantageous in considerable reduction of switching loss and improvement in conversion efficiency of the switching power source in wide operation load range.

Figure 20:
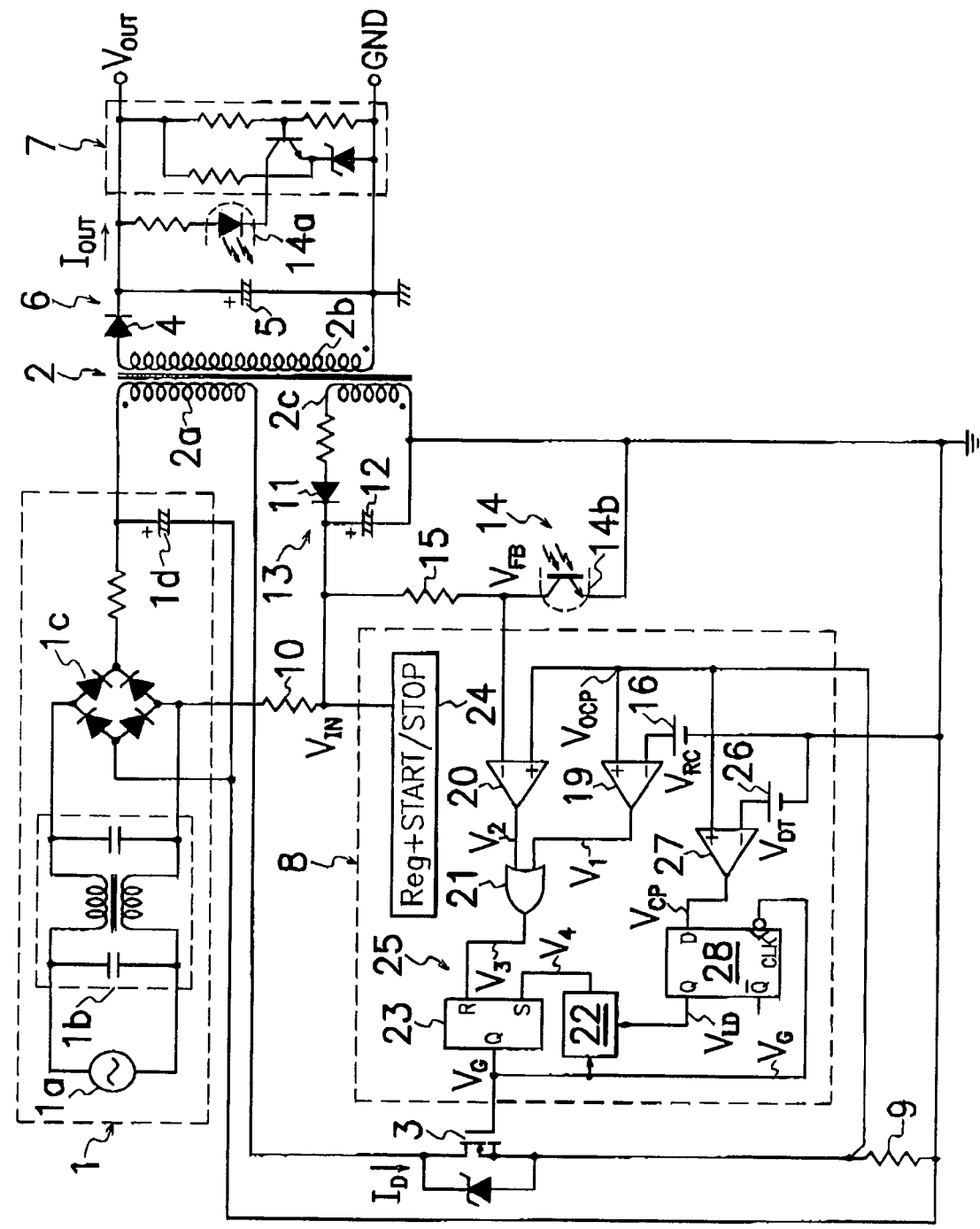
FIG. 20 is an electric circuit diagram of an embodiment to detect as a positive voltage a switching current in the circuit of FIG. 2.
Figure 21:
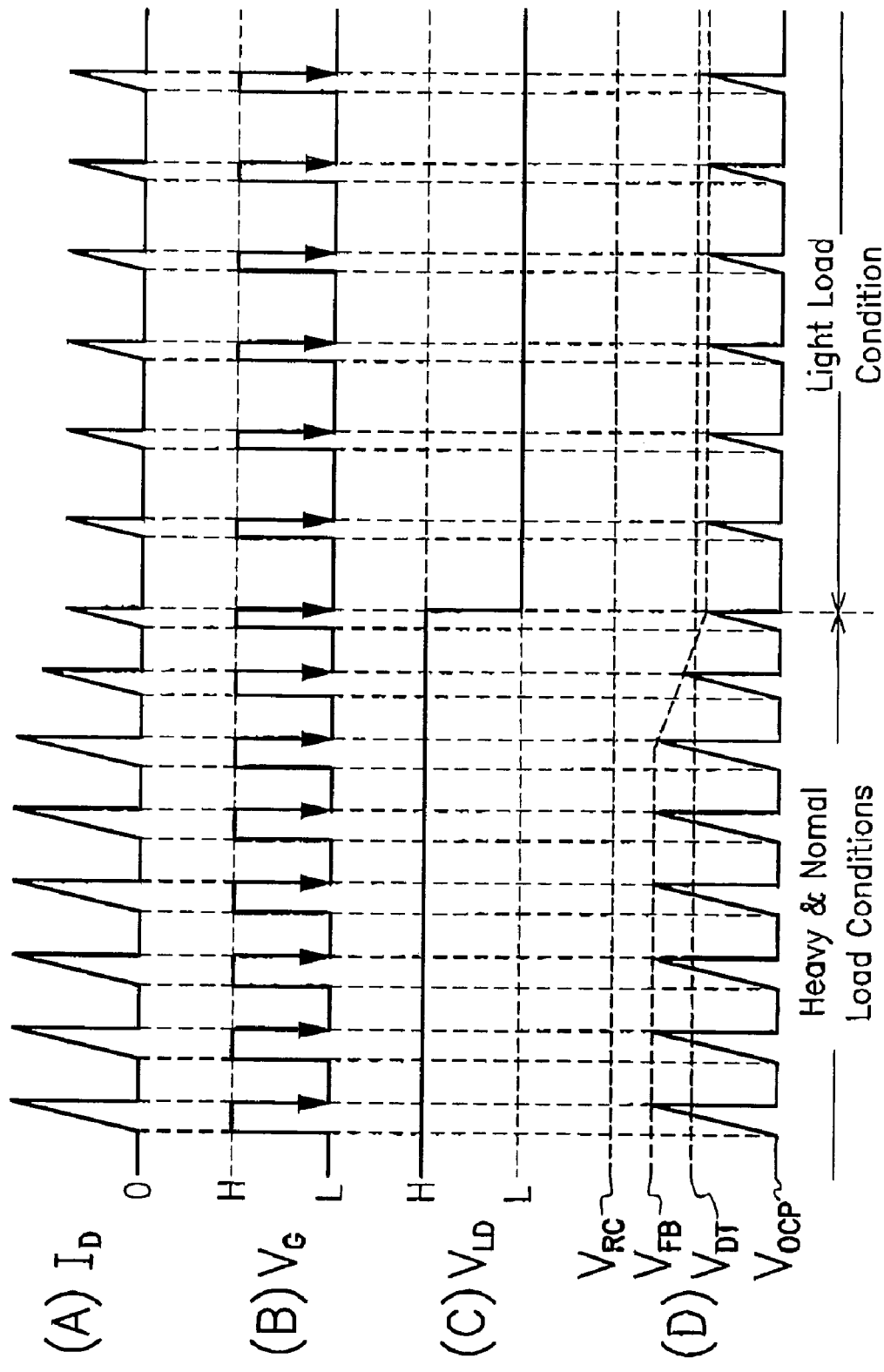
FIG. 21 is a time chart showing an electric current and voltages for various points in the circuit of FIG. 20.

In the embodiments shown in FIGS. 2 to 18, DC-DC converters of separately excited flyback type demonstrate that current detection resistor 9 detects as a negative voltage electric current $I_D$ flowing through primary winding 2a of transformer 2 or MOS-FET 3 to apply divided voltage $V_{OCP}$ to each inverted input terminal (−) of overcurrent restricting comparator 19, current mode control comparator 20 and current detection comparator 27. Alternatively, as shown in FIG. 20, current detection resistor 9 may detect as a positive voltage electric current $I_D$ flowing through primary winding 2a of transformer 2 or MOS-FET 3 to apply the detected positive voltage directly to each non-inverted input terminal (+) of overcurrent restricting comparator 19, current mode control comparator 20 and current detection comparator 27. In the DC-DC converter shown in FIG. 20, when drive signal $V_G$ to gate terminal of MOS-FET 3 is switched from low voltage level L to high voltage level H to turn MOS-FET 3 on, drain current $I_D$ through MOS-FET 3 linearly increases as shown in FIG. 21(A), and simultaneously detection voltage $V_{OCP}$ on current detection resistor 9 linearly increases as shown in FIG. 21(D).

Under the heavy and normal load conditions, as detection signal $V_{FB}$ from output voltage detector 7 indicates the voltage level higher than reference voltage level $V_{DT}$ of power source 26, detection voltage $V_{OCP}$ on current detection resistor 9 rectilinearly increases above reference voltage level $V_{DT}$ of power source 26 to generate current detection signal $V_{CP}$ of high voltage level H from current detection comparator 27. Thereafter, when detection voltage $V_{OCP}$ on current detection resistor 9 reaches detection signal $V_{FB}$ from output voltage detector 7 as shown in FIG. 21(D), drive signal $V_G$ to gate terminal of MOS-FET 3 changes from high voltage level H to low voltage level L as shown in FIG. 21(B) to turn MOS-FET 3 from the on to the off condition, lowering drain current $I_D$ through MOS-FET 3 to nearly zero level as shown in FIG. 21(A). At this time, trailing edge of drive signal $V_G$ of FIG. 21(B) is applied to clock input terminal CLK of D-flip flop 28, and at the same time, current detection comparator 27 produces current detection signal $V_{CP}$ of high voltage level H to input terminal D of D-flip flop 28 to keep high voltage level H of signal $V_{LD}$ at the output terminal Q as shown in FIG. 21(C). In this way, under the heavy and normal load conditions, pulse generator 22 produces pulse signal $V_4$ of shorter cycle to reduce the off period of MOS-FET 3, increasing oscillation frequency.

On the other hand, under the light load condition, since output voltage detector 7 produces detection signal $V_{FB}$ of voltage level lower than reference voltage level $V_{DT}$ of power source 26, detection voltage $V_{OCP}$ on current detection resistor 9 does not reach reference voltage level $V_{DT}$ of power source 26, and current detection comparator 27 produces current detection signal $V_{CP}$ of low voltage level L. When detection voltage $V_{OCP}$ on current detection resistor 9 comes up to detection signal level $V_{FB}$ from output voltage detector 7 as shown in FIG. 21(D), drive signal $V_G$ changes from high voltage level H to low voltage level L as shown in FIG. 21(B) to turn MOS-FET 3 from the on condition to the off condition, causing drain current $I_D$ through MOS-FET 3 to decline to approximately zero level as shown in FIG. 21(A). At the moment, trailing edge (shown by arrow of FIG. 21(B)) of drive signal $V_G$ is supplied to clock input terminal CLK of D-flip flop 28, and current detection signal $V_{CP}$ of low voltage level L from current detection comparator 27 is sent to input terminal D of D-flip flop 28 to switch signal $V_{LD}$ from output terminal Q of D-flip flop 28 from high voltage level H to low voltage level L as shown in FIG. 21(C). Accordingly, pulse generator 22 produces pulse signals $V_4$ of longer cycle under the light load condition to elongate the off period of MOS-FET 3 for decrement of oscillation frequency.

The embodiment shown in FIG. 20 is advantageous in the simplified electric circuit due to omission of level-shifting resistors 17 and 18 from control circuit 8 shown in FIGS. 2 to 18. Measures for detecting switching current includes a negative detection (FIGS. 2 to 18) and a positive detection (FIG. 20), and either of them is applicable to the present invention while they have their advantages and disadvantages.

Figure 22:
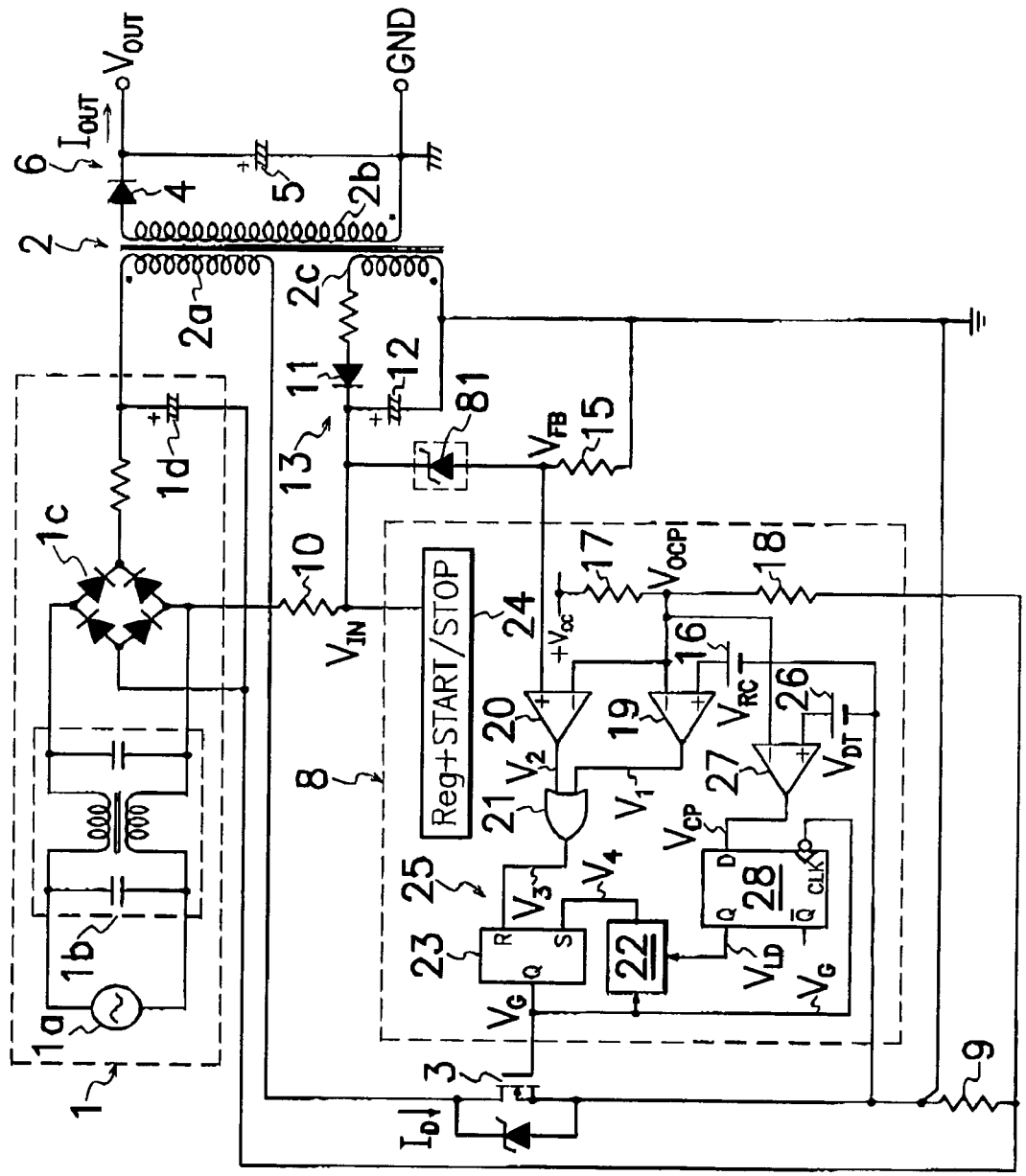
FIG. 22 is an electric circuit diagram of an embodiment according to the present invention to detect a DC output voltage on the secondary side through a drive winding.
Figure 23:
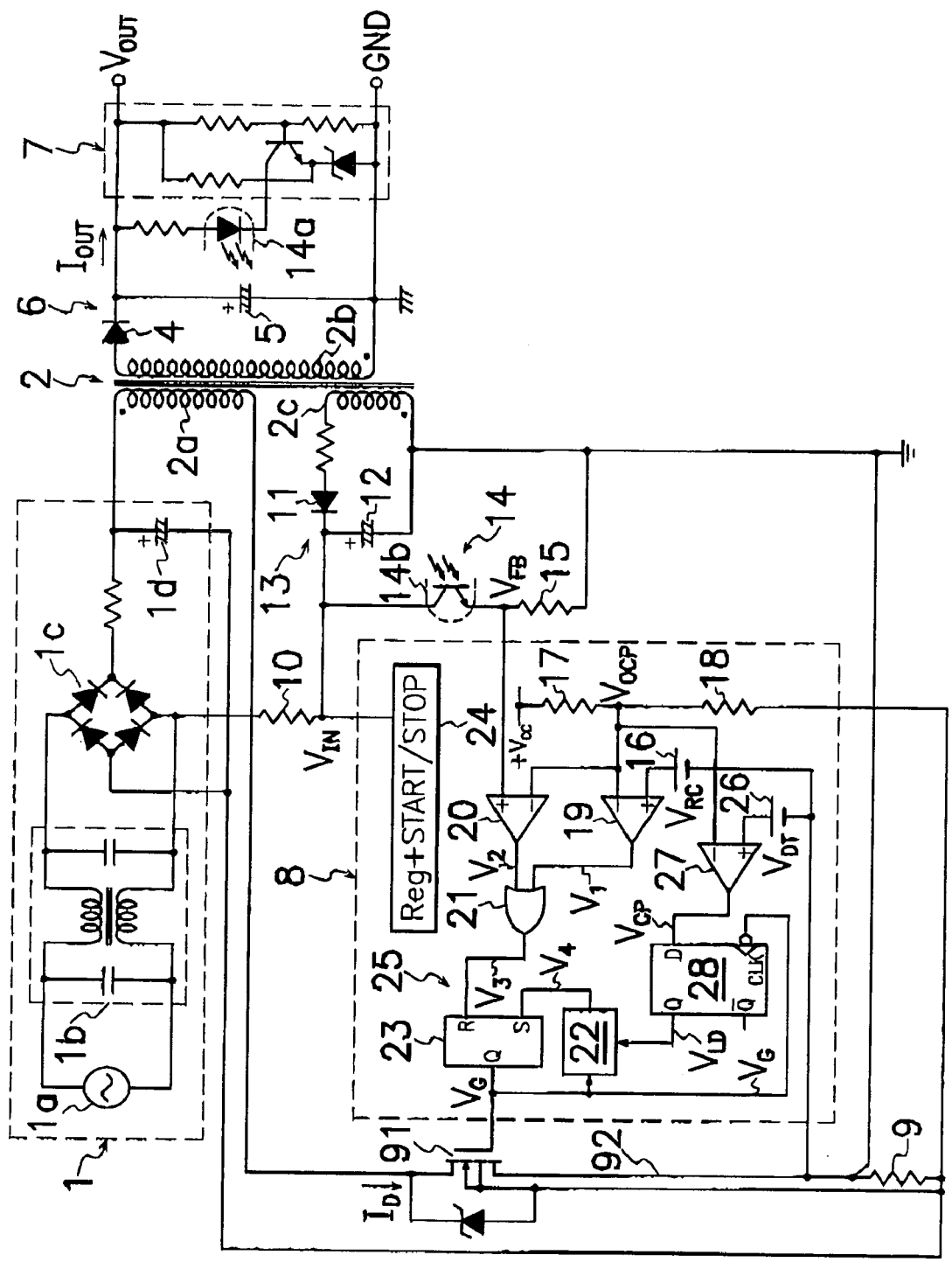
FIG. 23 is an electric circuit diagram of an embodiment using a current-sensible MOS-FET.

The present invention should not be limited to any one or all of the foregoing embodiments which can be further varied in various ways as follows:

[1] The preceding embodiments exhibit transmission of DC output voltage $V_{OUT}$ from output rectifying smoother 6 as detection signals $V_{FB}$ from output voltage detector 7 on the secondary side to the primary side through photo-coupler 14 of light emitting and receiving elements 14a and 14b. Unlike this, FIG. 22 represents an alternative which utilizes a Zener diode 81 having the Zener voltage above drive voltage for control circuit 8 in lieu of output voltage detector 7 and photo-coupler 14 to discern detection signal $V_{FB}$ from drive winding 2c of transformer 2 as an equivalent of DC output voltage $V_{OUT}$ from output rectifying smoother 6. Specifically, drive winding 2c of FIG. 22 produces a voltage of the proportional level to output voltage from secondary winding 2b of transformer 2, and therefore, DC voltage $V_{IN}$ from drive winding 2c is in proportion to DC output voltage $V_{OUT}$ on secondary winding 2b. In this way, since drive winding 2c enables to detect change in DC output voltage $V_{OUT}$ on secondary winding 2b, the converter shown in FIG. 22 does need neither output voltage detector 7 nor photo-coupler 14, achieving the simplified circuitry on the secondary side.

[2] The above-described embodiments display detection as a negative or positive voltage of electric current $I_D$ flowing through primary winding 2a of transformer 2 or MOS-FET 3 by means of current detecting resistor 9 connected in series to primary winding 2a or MOS-FET 3. Instead, FIG. 23 contemplates utilization of a switching element which comprises a sense MOS-FET 91 having a current detection terminal 92 as a shunt for dividing electric current $I_D$ flowing through a closed circuit inclusive of primary winding 2a of transformer 2 to convert electric current passing through current detection terminal 92 into a corresponding voltage with current detection resistor 9.

[3] FIG. 9 illustrates the converter which comprises double series stage D-flip flops 50 and 51 for turning MOS-FET 3 on at the second minimum point of voltage between drain and source terminals of MOS-FET 3 during the light load condition, however, the converter may comprise three or more series stage D-flip flops for turning MOS-FET 3 on at the third or every third or more minimum point of voltage between drain and source terminals of MOS-FET 3 during the light load condition. This arrangement allows further decrease in oscillation frequency of drive signals $V_G$ applied to gate terminal of MOS-FET 3 to achieve further reduction of switching loss under the light load condition.

[4] Similarly to the embodiment shown in FIG. 16, control circuit 8 may comprise three sets of power sources 26, current detection comparators 27 and D-flip flops 28 to more finely control oscillation frequency of drive signals $V_G$ to gate terminal of MOS-FET 3 under the light load condition in response to the load state.

Figure 24:
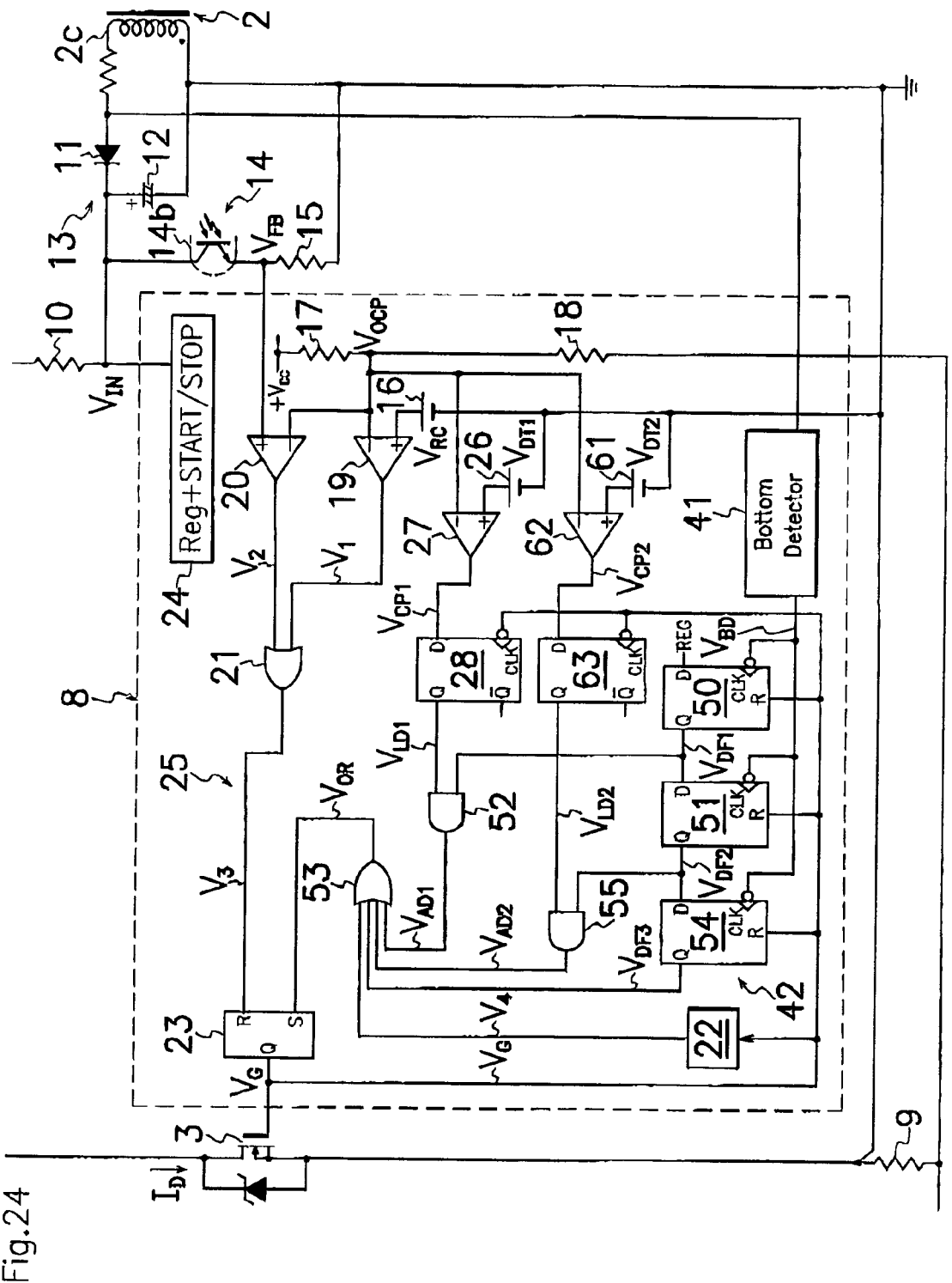
FIG. 24 is an electric circuit diagram of FIG. 16 incorporated with a skip controller.
Figure 25:
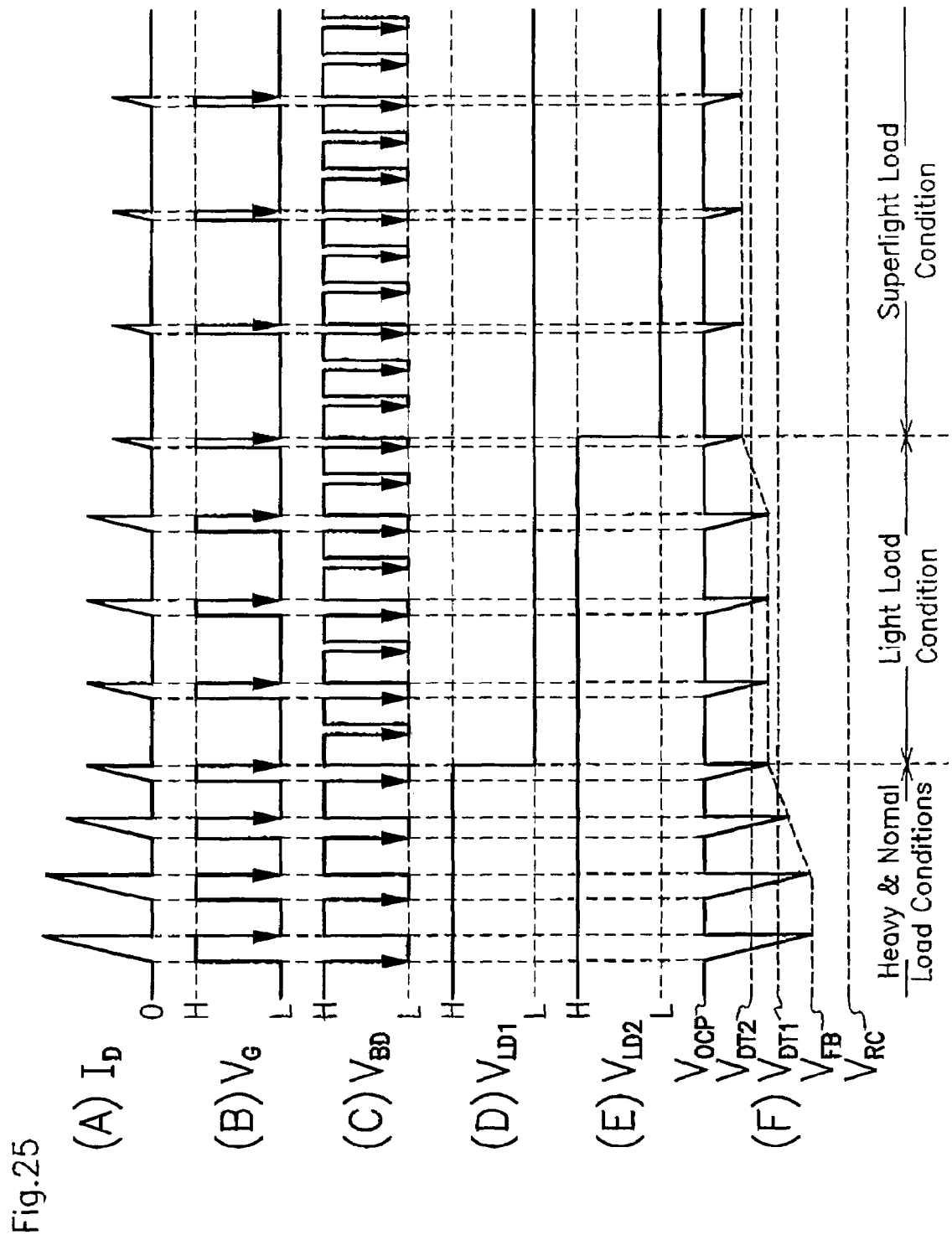
FIG. 25 is a time chart showing an electric current and voltages for various points in the circuit of FIG. 24.
Figure 26:
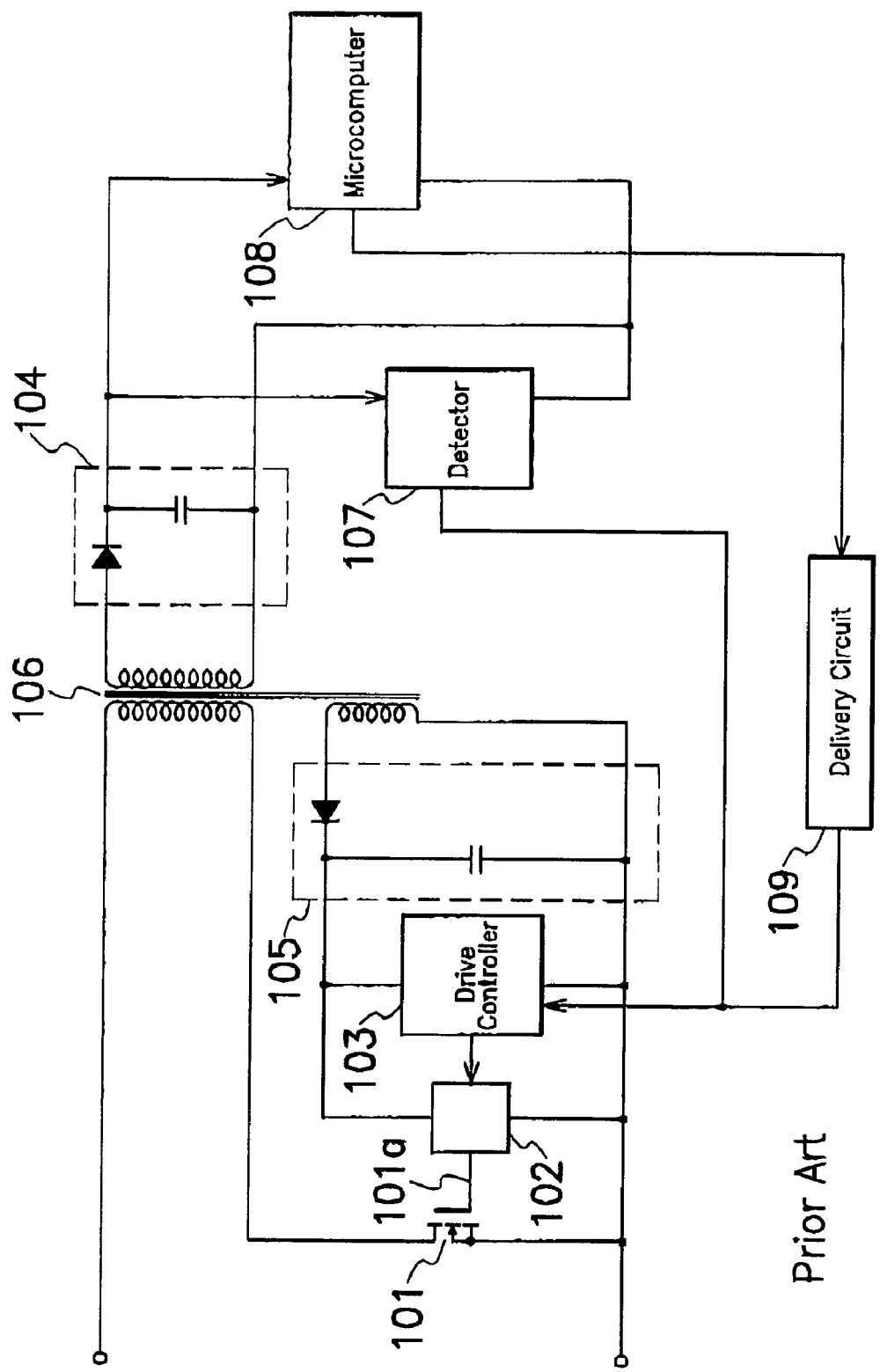
FIG. 26 is an electric circuitry showing a prior art switching power source.
Figure 27:
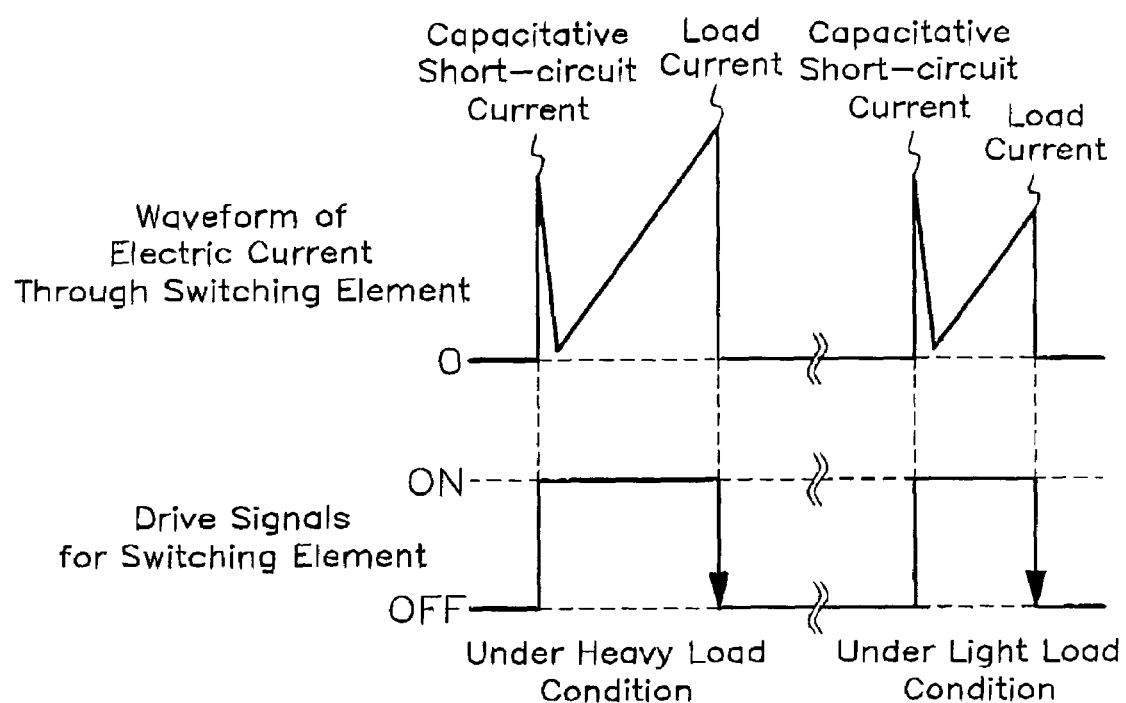
FIG. 27 is a waveform diagram of switching current under the heavy and light load conditions of the prior art switching power source.

[5] Also, as shown in FIG. 24, the converter of FIG. 16 may comprise bottom detection circuit 41 and skip control circuit 42 shown in FIG. 9. Specifically, DC-DC converter of separately excited flyback type shown in FIG. 24 comprises control circuit 8 which is provided with bottom detection circuit 41 and skip control circuit 42. Bottom detection circuit 41 serves to discern minimum points of voltage $V_{DS}$ between drain and source terminals of MOS-FET 3 in the light of ringing voltages produced on drive winding 2c of transformer 2 during the off period of MOS-FET 3. Skip control circuit 42 functions to firstly turn MOS-FET 3 on at the first minimum point of voltage $V_{DS}$ discerned by bottom detection circuit 41 when both of D-flip flops 28 and 63 produce output signals $V_{LD1}$ and $V_{LD2}$ of high voltage level H, secondly turn MOS-FET 3 on at the second minimum point of voltage $V_{DS}$ discerned by bottom detection circuit 41 when first and second D-flip flops 28 and 63 produce output signals $V_{LD1}$ and $V_{LD2}$ of respectively low voltage level L and high voltage level H; and thirdly turn MOS-FET 3 on at the third minimum point of voltage $V_{DS}$ discerned by bottom detection circuit 41 when both of first and second D-flip flops 28 and 63 produce output signals $V_{LD1}$ and $V_{LD2}$ of low voltage level L. Skip control circuit 42 shown in FIG. 24 comprises third, fourth and fifth D-flip flops 50, 51 and 54 connected in series; a first AND gate 52 for outputting logical product signal $V_{AD1}$ of output signal $V_{DF1}$ from third D-flip flop 50 and output signal $V_{LD1}$ from first D-flip flop 28; a second AND gate 55 for outputting logical product signal $V_{AD2}$ of output signal $V_{DF2}$ from fourth D-flip flop 51 and output signal $V_{LD2}$ from second D-flip flop 63; and an OR gate 53 for outputting logical sum signal $V_{OR}$ of pulse signal $V_4$ from pulse generator 22, output signal $V_{DF3}$ from fifth D-flip flop 54, logical product signal $V_{AD1}$ from first AND gate 52, and logical product signal $V_{AD2}$ from second AND gate 55. In other words, as both of D-flip flops 28 and 63 of skip control circuit 42 shown in FIG. 24, produce output signals $V_{LD1}$ and $V_{LD2}$ of high voltage level H under the heavy and normal load conditions as shown in FIGS. 25(D) and 25(E), logical product signals $V_{AD1}$ and $V_{AD2}$ from first and second AND gates 52 and 55 are respectively the same as output signals $V_{DF1}$ and $V_{DF2}$ from third and fourth D-flip flops 50 and 51. On the other hand, as third D-flip flop 50 produces a single pulsatie output signal $V_{DF1}$ of high voltage level synchronously with initial rising edge of output signal $V_{BD}$ from bottom detection circuit 41 shown in FIG. 25(C), fourth and fifth D-flip flops 51 and 54 maintain output signals $V_{DF2}$ and $V_{DF3}$ of low voltage level L. Accordingly, as OR gate 53 produces a single pulsatile logical sum signal $V_{OR}$ of high voltage level H in synchronization with initial rising edge of output signal $V_{BD}$ from bottom detection circuit 41, MOS-FET 3 can be turned on at the first minimum voltage point perceived by bottom detection circuit 41 under the heavy and normal load conditions. Also, under the light load condition, first and second D-flip flops 28 and 63 produce respectively output signal $V_{LD1}$ of low voltage level L and output signal $V_{LD2}$ of high voltage level H so that first AND gate 52 generates logical product signal $V_{AD1}$ of low voltage level L. On the other hand, fourth D-flip flop 51 produces a single pulsatile output signal $V_{DF2}$ of high voltage level H synchronously with a second trailing edge of output signal $V_{BD}$ from bottom detection circuit 41 shown in FIG. 25(C), and therefore, second AND gate 55 produces logical product signals $V_{AD2}$ same as output signal $V_{DF2}$ so that OR gate 53 produces a single pulsative logical sum signal $V_{OR}$ of high voltage level H coincidentally with a second trailing edge of output signal $V_{BD}$ from bottom detection circuit 41. In this way, MOS-FET 3 can be turned on at the second minimum voltage point descerned by bottom detection circuit 41 under the light load condition, Moreover, as both of D-flip flops 28 and 63 produce output signals $V_{LD1}$ and $V_{LD2}$ of low voltage level L under the superlight load condition as shown in FIGS. 25(D) and 25(E), both of first and second AND gates 52 and 55 produce logical product signals $V_{AD1}$ and $V_{AD2}$ of low voltage level L. However, because fifth D-flip flop 54 produces a single pulsatile signal $V_{DF3}$ of high voltage level synchronously with a third trailing edge of output signal $V_{BD}$ from bottom detection circuit 41 shown in FIG. 25(C), OR gate 53 produces a single pulsatile logical sum signal $V_{OR}$ of high voltage level H concurrently with a third trailing edge of output signal $V_{BD}$ from bottom detection circuit 41. In this way, MOS-FET 3 can be turned on at the third minimum voltage point picked out by bottom detection circuit 41 under the superlight load condition. Accordingly, similarly to the embodiment shown in FIG. 16, the embodiment shown in FIG. 24 also can achieve reduction of oscillation frequency to different two frequencies of drive signal $V_G$ applied to gate terminal to MOS-FET 3 as shown in FIG. 25(B) under the light and superlight load conditions to more finely control oscillation frequency of drive signal $V_G$ of MOS-FET 3 for further enhancement of conversion efficiency in switching power source. Still further modifications can of course be made such as provision of three sets of reference power sources 26, current detection comparators 27 and D-flip flops 28 connected in parallel to each other, or provision of series four or more stage of D-flip flops 50 to reduce oscillation frequency of drive signal $V_G$ to different three or more frequencies in the light of load degrees.

[6] The foregoing embodiments of the invention offer converters of the type for controlling separately the on and off periods MOS-FET 3; and the type for controlling pseudo resonance in ringing choke converter. However, the present invention can also be applied to converters of general pulse width modulation type for controlling on-duty or on-period of MOS-FET.

[7] Moreover, the present invention can also be applied other switching power sources such as resonance type or separately excited forward type connected to DC power source or with power source for providing control circuit with electric power, without limitation to DC-DC converters of separately excited flyback type.

The switching power source according to the present invention, is advantageous because it is immune from foreign noise such as induction noise and load condition on the secondary side can precisely and certainly be detected on the primary side with minimum number of required components because the load condition on the secondary side is examined at the switching point of turning a switching element from the on condition to the off condition. Accordingly, shift to an optimal oscillation operation in the switching power source based on detection output of the load condition enables improvement in conversion efficiency.

INDUSTRIAL APPLICABILITY

The present invention can be applied to AC adoptors for electronic devices such as portable personal computers, mobile phones or personal handyphone systems provided with large scale public addressor such as microcomputer.

What is claimed is:

1. A switching power source comprising a DC power source; a primary winding of a transformer and a switching element connected in series to the DC power source; a current detector for acquiring electric current flowing through the primary winding of the transformer or the switching element; a rectifying smoother connected to a secondary winding of the transformer for generating DC output voltage; and a control circuit for supplying the switching element with drive signals to turn the switching element on and off so as to keep the DC output voltage in a substantially constant level;

said control circuit comprising a current comparator for comparing a voltage level of signals acquired by the current detector with a reference voltage level to produce detection signals of first or second level;

an edge detector for sensing an edge of drive signal supplied to a control terminal of the switching element during the period of transition from turning on to off of the switching element; and a decision means for receiving a current detection signal from the current comparator to produce an output signal when the edge detector catches an edge of drive signal;

wherein the decision means produces the different output signals of respectively first and second voltage levels under the light load condition and non-light load conditions heavier than light load.

2. The switching power source of claim 1, wherein the control circuit comprises an oscillation controller which reduces the oscillation frequency of drive signals when the decision means produces the output signal of the first voltage level, and adversely, increases the oscillation frequency of drive signals when the decision means produces the output signal of the second voltage level.

3. The switching power source of claim 1, wherein the control circuit comprises a voltage adjuster which either controls the reference voltage level of the current comparator in the same direction as the movement of peak voltage value of detection signal by the current detector or controls the voltage level of the detection signal in the opposite direction from the movement of peak voltage value of detection signal by the current detector, when the decision means changes the voltage level of the output signal.

4. The switching power source of any one of claims 1, wherein the control circuit comprises a bottom voltage detector for detecting a minimum level of the voltage between main terminals of the switching element during the off period thereof; and a skip controller which turns the switching element on in response to a first minimum level of the voltage detected by the bottom voltage detector when the decision means produces the output signal of the second voltage level, otherwise, turns the switching element on in response to a second or later minimum level detected by the bottom voltage detector when the decision means produces the output signal of the first voltage level.

5. The switching power source of claim 4, wherein the bottom voltage detector comprises a wave forming means for transforming, into pulse arrays, ringing voltages produced on a drive winding of the transformer during the off period of the switching element, and the bottom voltage detector may find a rising edge of the pulse array voltage as a minimum level of the voltage across the switching element.

6. The switching power source of claim 1, further comprising: a plurality of current comparators, a plurality of edge detectors and a plurality of decision means wherein the current comparators compare a detection signal by current detector with levels of different reference voltages to reduce oscillation frequencies of drive signals to different frequencies by output signals of the first voltage level outputs from the plurality of decision means.

7. The switching power source of claim 1, wherein the control circuit comprises an intermittent oscillation controller for suspending the on-off operation of the switching element for a given period of time sufficiently longer than an oscillation cycle of the drive signals when the decision means produces the output signal of the first voltage level.

8. The switching power source of claim 1, wherein the edge detector and decision means comprises D-flip flops.

9. The switching power source of claim 1, further comprising a trigger means connected to the DC power source for supplying the control circuit with drive power; a drive winding electro-magnetically connected to the primary and secondary winding of the transformer; and an auxiliary rectifying smoother connected to the drive winding for supplying the control circuit with DC power.

10. The switching power source of claim 1, further comprising a control power circuit connected to the DC power source for supplying the control circuit with drive power.

11. The switching power source of claim 1, wherein the switching element comprises a shunt for dividing electric current flowing through a closed circuit inclusive of the primary winding;

the current detector detects electric current divided by the shunt.

* * * * *